(12) United States Patent
Stewart

(10) Patent No.: US 11,015,809 B2
(45) Date of Patent: May 25, 2021

(54) PILOT NOZZLE IN GAS TURBINE COMBUSTOR

(71) Applicant: General Electric Company, Schenectady, NY (US)

(72) Inventor: Jason Thurman Stewart, Greer, SC (US)

(73) Assignee: General Electric Company, Schenectady, NY (US)

( * ) Notice: Subject to any disclaimer, the term of this patent is extended or adjusted under 35 U.S.C. 154(b) by 485 days.

(21) Appl. No.: 14/585,787

(22) Filed: Dec. 30, 2014

(65) Prior Publication Data
US 2016/0186662 A1    Jun. 30, 2016

(51) Int. Cl.
*F23R 3/00* (2006.01)
*F23R 3/28* (2006.01)
*F23R 3/14* (2006.01)

(52) U.S. Cl.
CPC .......... *F23R 3/286* (2013.01); *F23R 3/14* (2013.01); *Y02T 50/60* (2013.01)

(58) Field of Classification Search
CPC .... F23R 3/14; F23R 3/286; F23R 3/32; F23R 3/045; F23R 3/46; F23R 3/343; F23R 2900/03343; F23D 14/02; F23D 14/085; F23D 2900/00014; F23D 2900/14021; F23D 2900/14701; F23C 2900/07001
See application file for complete search history.

(56) References Cited

U.S. PATENT DOCUMENTS 5,596,873 A * 1/1997 Joshi ................. F23R 3/286
                                                       60/738
6,065,961 A * 5/2000 Shaffer ............... F23D 14/02
                                                       431/173
(Continued)

FOREIGN PATENT DOCUMENTS

JP          H1337068 A        12/1999
JP        2005524037 A         8/2005
(Continued)

OTHER PUBLICATIONS

Japanese Office Action for JP Application No. 2015-244701 dated Sep. 13, 2019; 7 pgs.
(Continued)

*Primary Examiner* — Todd E Manahan
*Assistant Examiner* — Edwin Kang
(74) *Attorney, Agent, or Firm* — Fletcher Yoder, P.C.

(57) ABSTRACT

A fuel nozzle for a gas turbine engine that includes: an elongated centerbody; an elongated peripheral wall formed about the centerbody so to define a primary flow annulus therebetween; a primary fuel supply and a primary air supply in fluid communication with an upstream end of the primary flow annulus; and a pilot nozzle. The pilot nozzle may be formed in the centerbody and include: axially elongated mixing tubes defined within a centerbody wall; a fuel port positioned on the mixing tubes for connecting each to a secondary fuel supply; and a secondary air supply configured so to fluidly communicate with an inlet of each of the mixing tubes. A plurality of the mixing tubes may be formed as canted mixing tubes that are configured for inducing a swirling flow about the central axis in a collective discharge therefrom.

18 Claims, 14 Drawing Sheets

(56) References Cited

U.S. PATENT DOCUMENTS

| | | | |
|---|---|---|---|
| 6,438,961 B2 | 8/2002 | Tuthill et al. | |
| 6,446,439 B1 | 9/2002 | Kraft et al. | |
| 6,547,163 B1 * | 4/2003 | Mansour | B05B 1/3405 239/404 |
| 6,622,488 B2 * | 9/2003 | Mansour | F23D 11/107 239/403 |
| 7,854,121 B2 | 12/2010 | Vandale et al. | |
| 8,281,595 B2 * | 10/2012 | Davis, Jr. | F23D 14/82 60/737 |
| 9,074,764 B2 | 7/2015 | Hull et al. | |
| 2001/0052229 A1 | 12/2001 | Tuthill et al. | |
| 2003/0167771 A1 * | 9/2003 | Hayashi | F23D 14/70 60/737 |
| 2009/0165436 A1 | 7/2009 | Herbon et al. | |
| 2009/0293484 A1 * | 12/2009 | Inoue | F23R 3/286 60/740 |
| 2010/0031661 A1 * | 2/2010 | Varatharajan | F23R 3/14 60/737 |
| 2011/0005229 A1 | 1/2011 | Venkataraman et al. | |
| 2011/0162371 A1 | 7/2011 | Khan et al. | |
| 2012/0036855 A1 | 2/2012 | Hull et al. | |
| 2012/0180487 A1 * | 7/2012 | Uhm | F23D 14/62 60/737 |
| 2013/0219899 A1 * | 8/2013 | Uhm | F23R 3/14 60/738 |
| 2013/0283805 A1 * | 10/2013 | Zuo | F23R 3/14 60/748 |
| 2014/0238036 A1 * | 8/2014 | Uhm | F23R 3/286 60/776 |

FOREIGN PATENT DOCUMENTS

| | | |
|---|---|---|
| JP | 2007163125 A | 6/2007 |
| JP | 2013174431 A | 9/2014 |
| JP | 2014163664 A | 9/2014 |

OTHER PUBLICATIONS

Japanese Search Report for JP Application No. JP2015244701 dated Sep. 4, 2019; 12 pgs.

* cited by examiner

PILOT NOZZLE IN GAS TURBINE COMBUSTOR

BACKGROUND OF THE INVENTION

The present invention generally involves a gas turbine engine that combusts a hydrocarbon fuel mixed with air to generate a high temperature gas stream that drives turbine blades to rotate a shaft attached to the blades. More particularly, but not by way of limitation, the present invention relates to combustor fuel nozzles that include pilot nozzles that premix fuel and air to achieve lower nitrogen oxides.

Gas turbine engines are widely used to generate power for numerous applications. A conventional gas turbine engine includes a compressor, a combustor, and a turbine. In a typical gas turbine engine, the compressor provides compressed air to the combustor. The air entering the combustor is mixed with fuel and combusted. Hot gases of combustion are exhausted from the combustor and flow into the blades of the turbine so as to rotate the shaft of the turbine connected to the blades. Some of that mechanical energy of the rotating shaft drives the compressor and/or other mechanical systems.

As government regulations disfavor the release of nitrogen oxides into the atmosphere, their production as byproducts of the operation of gas turbine engines is sought to be maintained below permissible levels. One approach to meeting such regulations is to move from diffusion flame combustors to combustors that employ lean fuel and air mixtures using a fully premixed operations mode to reduce emissions of, for example, nitrogen oxides (commonly denoted NOx) and carbon monoxide (CO). These combustors are variously known in the art as Dry Low NOx (DLN), Dry Low Emissions (DLE) or Lean Pre Mixed (LPM) combustion systems.

Fuel-air mixing affects both the levels of nitrogen oxides generated in the hot gases of combustion of a gas turbine engine and the engine's performance. A gas turbine engine may employ one or more fuel nozzles to intake air and fuel to facilitate fuel-air mixing in the combustor. The fuel nozzles may be located in a headend of the combustor, and may be configured to intake an air flow to be mixed with a fuel input. Typically, each fuel nozzle may be internally supported by a center body located inside of the fuel nozzle, and a pilot can be mounted at the downstream end of the center body. As described for example in U.S. Pat. No. 6,438,961, which is incorporated in its entirety herein by this reference for all purposes, a so-called swozzle can be mounted to the exterior of the center body and located upstream from the pilot. The swozzle has curved vanes that extend radially from the center body across an annular flow passage and from which fuel is introduced into the annular flow passage to be entrained into a flow of air that is swirled by the vanes of the swozzle.

Various parameters describing the combustion process in the gas turbine engine correlate with the generation of nitrogen oxides. For example, higher gas temperatures in the combustion reaction zone are responsible for generating higher amounts of nitrogen oxides. One way of lowering these temperatures is by premixing the fuel-air mixture and reducing the ratio of fuel to air that is combusted. As the ratio of fuel to air that is combusted is lowered, so too the amount of nitrogen oxides is lowered. However, there is a trade-off in performance of the gas turbine engine. For as the ratio of fuel to air that is combusted is lowered, there is an increased tendency of the flame of the fuel nozzle to blow out and thus render unstable the operation of the gas turbine engine. A pilot of a diffusion flame type has been used for better flame stabilization in a combustor, but doing so increases NOx. Accordingly, there remains a need for improved pilot nozzle assemblies that offer flame stabilization benefits while also minimizing the NOx emissions generally associated with pilot nozzles.

BRIEF DESCRIPTION OF THE INVENTION

The present application thus describes a fuel nozzle for a gas turbine engine. The fuel nozzle may include: an axially elongated centerbody; an axially elongated peripheral wall formed about the centerbody so to define a primary flow annulus therebetween; a primary fuel supply and primary air supply in fluid communication with an upstream end of the primary flow annulus; and a pilot nozzle. The pilot nozzle may be formed in the centerbody that includes: axially elongated mixing tubes defined within a centerbody wall, each of the mixing tubes extending between an inlet defined through an upstream face of the pilot nozzle and an outlet formed through a downstream face of the pilot nozzle; a fuel port positioned between the inlet and the outlet of each of the mixing tubes for connecting each of the mixing tubes to a secondary fuel supply; and a secondary air supply configured so to fluidly communicate with the inlet of each of the mixing tubes. A plurality of the mixing tubes may be formed as canted mixing tubes that are configured for inducing a swirling flow about the central axis in a collective discharge therefrom.

DETAILED DESCRIPTION OF THE INVENTION

Figure 1:
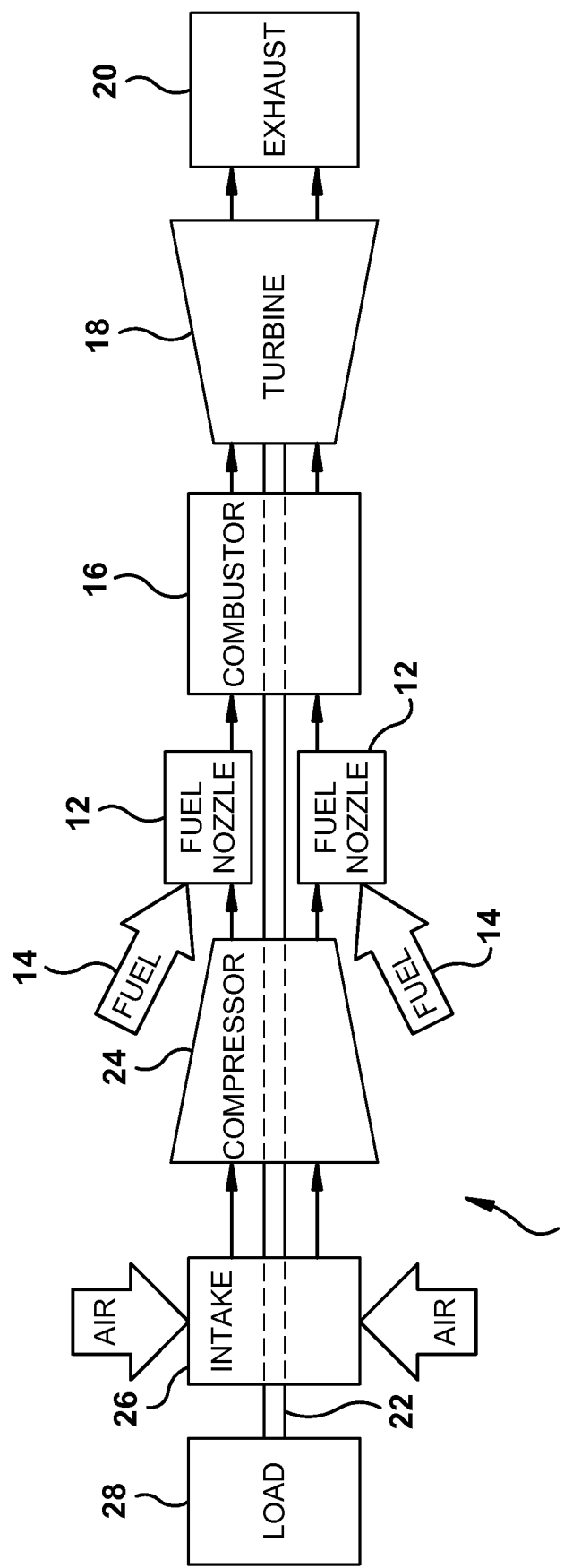
FIG. 1 illustrates a block diagram of an exemplary gas turbine in which embodiments of the present invention may be used.

Aspects and advantages of the invention are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention.

As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated.

Additionally, certain terms have been selected to describe the present invention and its component subsystems and parts. To the extent possible, these terms have been chosen based on the terminology common to the technology field. Still, it will be appreciate that such terms often are subject to differing interpretations. For example, what may be referred to herein as a single component may be referenced elsewhere as consisting of multiple components, or, what may be referenced herein as including multiple components may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to a certain type of turbine engine, the technology of the present invention also may be applicable to other types of turbine engines as would be understood by a person of ordinary skill in the relevant technological arts.

Given the nature of turbine engine operation, several descriptive terms may be used throughout this application to explain the functioning of the engine and/or the several sub-systems or components included therewithin, and it may prove beneficial to define these terms at the onset of this section. Accordingly, these terms and their definitions, unless stated otherwise, are as follows. The terms "forward" and "aft", without further specificity, refer to directions relative to the orientation of the gas turbine. That is, "forward" refers to the forward or compressor end of the engine, and "aft" refers to the aft or turbine end of the engine. It will be appreciated that each of these terms may be used to indicate movement or relative position within the engine. The terms "downstream" and "upstream" are used to indicate position within a specified conduit relative to the general direction of flow moving through it. (It will be appreciated that these terms reference a direction relative to an expected flow during normal operation, which should be plainly apparent to anyone of ordinary skill in the art.) The term "downstream" refers to the direction in which the fluid is flowing through the specified conduit, while "upstream" refers to the direction opposite that. Thus, for example, the primary flow of working fluid through a turbine engine, which begins as air moving through the compressor and then becomes combustion gases within the combustor and beyond, may be described as beginning at an upstream location toward an upstream or forward end of the compressor and terminating at an downstream location toward a downstream or aft end of the turbine. In regard to describing the direction of flow within a common type of combustor, as discussed in more detail below, it will be appreciated that compressor discharge air typically enters the combustor through impingement ports that are concentrated toward the aft end of the combustor (relative to the longitudinal axis of the combustor and the aforementioned compressor/turbine positioning defining forward/aft distinctions). Once in the combustor, the compressed air is guided by a flow annulus formed about an interior chamber toward the forward end of the combustor, where the air flow enters the interior chamber and, reversing its direction of flow, travels toward the aft end of the combustor. In yet another context, coolant flows through cooling passages may be treated in the same manner.

Additionally, given the configuration of compressor and turbine about a central common axis, as well as the cylindrical configuration common to many combustor types, terms describing position relative to an axis may be used herein. In this regard, it will be appreciated that the term "radial" refers to movement or position perpendicular to an axis. Related to this, it may be required to describe relative distance from the central axis. In this case, for example, if a first component resides closer to the central axis than a second component, the first component will be described as being either "radially inward" or "inboard" of the second component. If, on the other hand, the first component resides further from the central axis than the second component, the first component will be described herein as being either "radially outward" or "outboard" of the second component. Additionally, as will be appreciated, the term "axial" refers to movement or position parallel to an axis. Finally, the term "circumferential" refers to movement or position around an axis. As mentioned, while these terms may be applied in relation to the common central axis that extends through the compressor and turbine sections of the engine, these terms also may be used in relation to other components or subsystems of the engine. For example, in the case of a cylindrically shaped combustor, which is common to many gas turbine machines, the axis which gives these terms relative meaning is the longitudinal central axis that extends through the center of the cross-sectional shape, which is initially cylindrical, but transitions to a more annular profile as it nears the turbine.

Referring to FIG. 1, a simplified drawing of several portions of a gas turbine system 10 is illustrated. The turbine system 10 may use liquid or gas fuel, such as natural gas and/or a hydrogen rich synthetic gas, to run the turbine system 10. As depicted, a plurality of fuel-air nozzles (or, as referred to herein, "fuel nozzles 12") of the type described more fully below intakes a fuel supply 14, mixes the fuel with an air supply, and directs the fuel-air mixture into a combustor 16 for combusting. The combusted fuel-air mixture creates hot pressurized exhaust gases that may be directed through a turbine 18 toward an exhaust outlet 20. As the exhaust gases pass through the turbine 18, the gases force one or more turbine blades to rotate a shaft 22 along an axis of the turbine system 10. As illustrated, the shaft 22 may be connected to various components of the turbine system 10, including a compressor 24. The compressor 24 also includes blades that may be coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 also may be connected to a load 28, which may be a vehicle or a stationary load, such as an electrical generator in a power plant or a propeller on an aircraft, for example. As will be understood, the load 28 may include any suitable device capable of being powered by the rotational output of turbine system 10.

Figure 2:
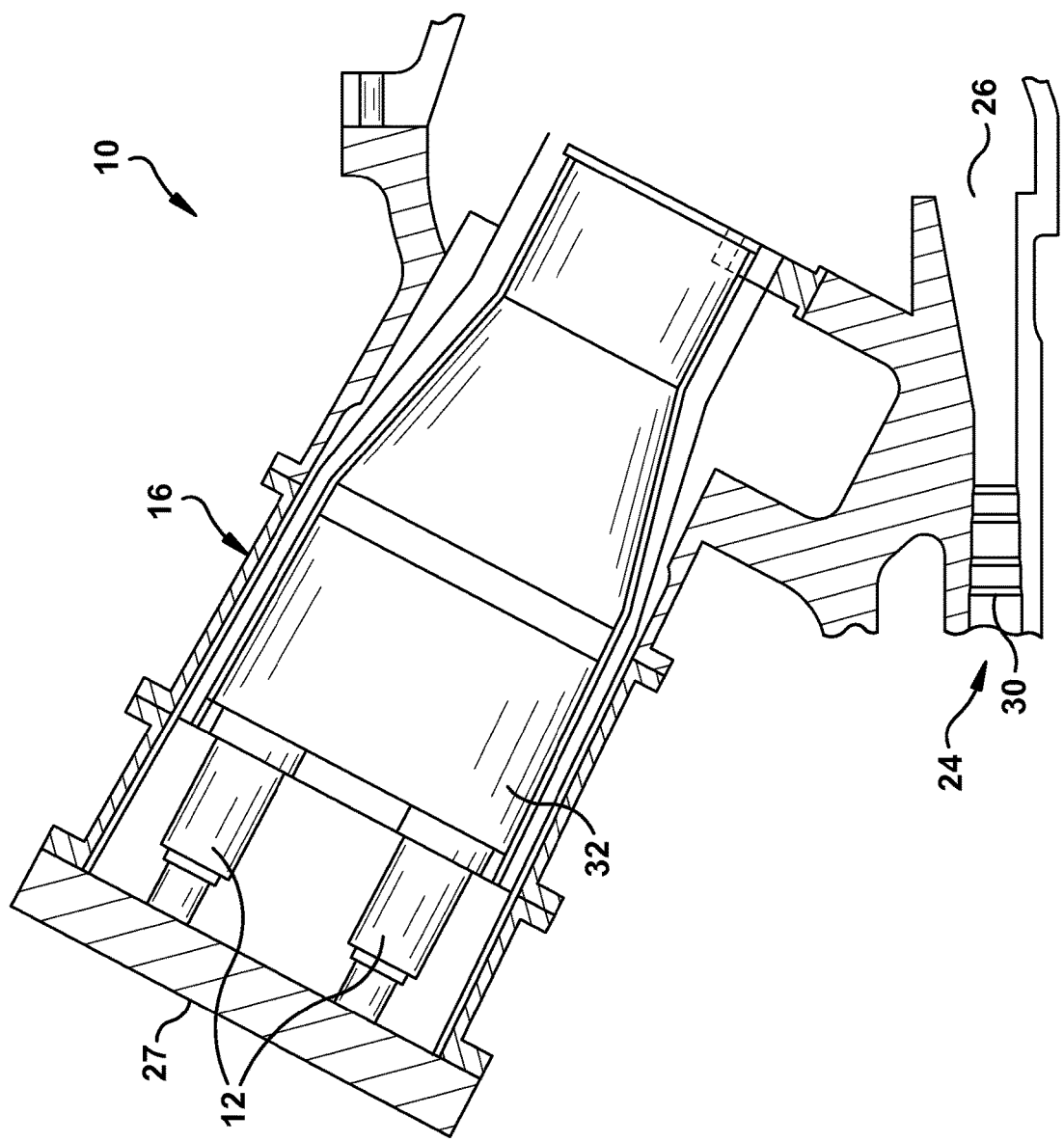
FIG. 2 is a cross-sectional view of an exemplary combustor such as may be used in the gas turbine illustrated in FIG. 1.

FIG. 2 is a simplified drawing of cross sectional views of several portions of the gas turbine system 10 schematically depicted in FIG. 1. As schematically shown in FIG. 2, the turbine system 10 includes one or more fuel nozzles 12 located in a headend 27 of the combustor 16 in the gas turbine engine 10. Each illustrated fuel nozzle 12 may include multiple fuel nozzles integrated together in a group and/or a standalone fuel nozzle, wherein each illustrated fuel nozzle 12 relies at least substantially or entirely on internal structural support (e.g., load bearing fluid passages). Referring to FIG. 2, the system 10 comprises a compressor section 24 for pressurizing a gas, such as air, flowing into the system 10 via air intake 26. In operation, air enters the turbine system 10 through the air intake 26 and may be pressurized in the compressor 24. It should be understood that while the gas may be referred to herein as air, the gas may be any gas suitable for use in a gas turbine system 10. Pressurized air discharged from the compressor section 24 flows into a combustor section 16, which is generally characterized by a plurality of combustors 16 (only one of which is illustrated in FIGS. 1 and 2) disposed in an annular array about an axis of the system 10. The air entering the combustor section 16 is mixed with fuel and combusted within the combustion chamber 32 of the combustor 16. For example, the fuel nozzles 12 may inject a fuel-air mixture into the combustor 16 in a suitable fuel-air ratio for optimal combustion, emissions, fuel consumption, and power output. The combustion generates hot pressurized exhaust gases, which then flow from each combustor 16 to a turbine section 18 (FIG. 1) to drive the system 10 and generate power. The hot gases drive one or more blades (not shown) within the turbine 18 to rotate the shaft 22 and, thus, the compressor 24 and the load 28. The rotation of the shaft 22 causes blades 30 within the compressor 24 to rotate and draw in and pressurize the air received by the intake 26. It readily should be appreciated, however, that a combustor 16 need not be configured as described above and illustrated herein and in general may have any configuration that permits pressurized air to be mixed with fuel, combusted and transferred to a turbine section 18 of the system 10.

Figure 3:
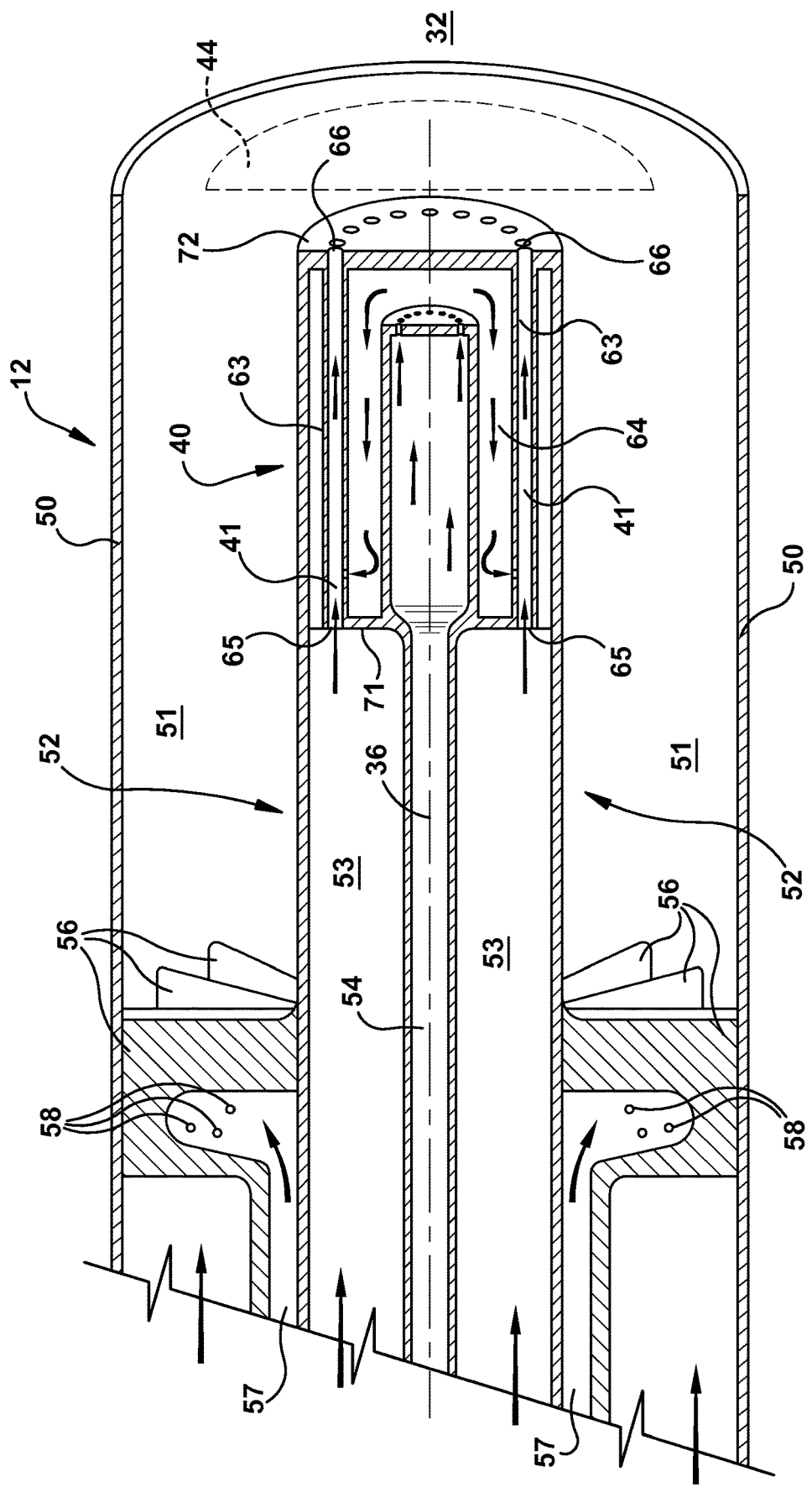
FIG. 3 includes a view that is partially in perspective and partially in cross-section that depicts an exemplary combustor nozzle according to certain aspects of the present invention.
Figure 4:
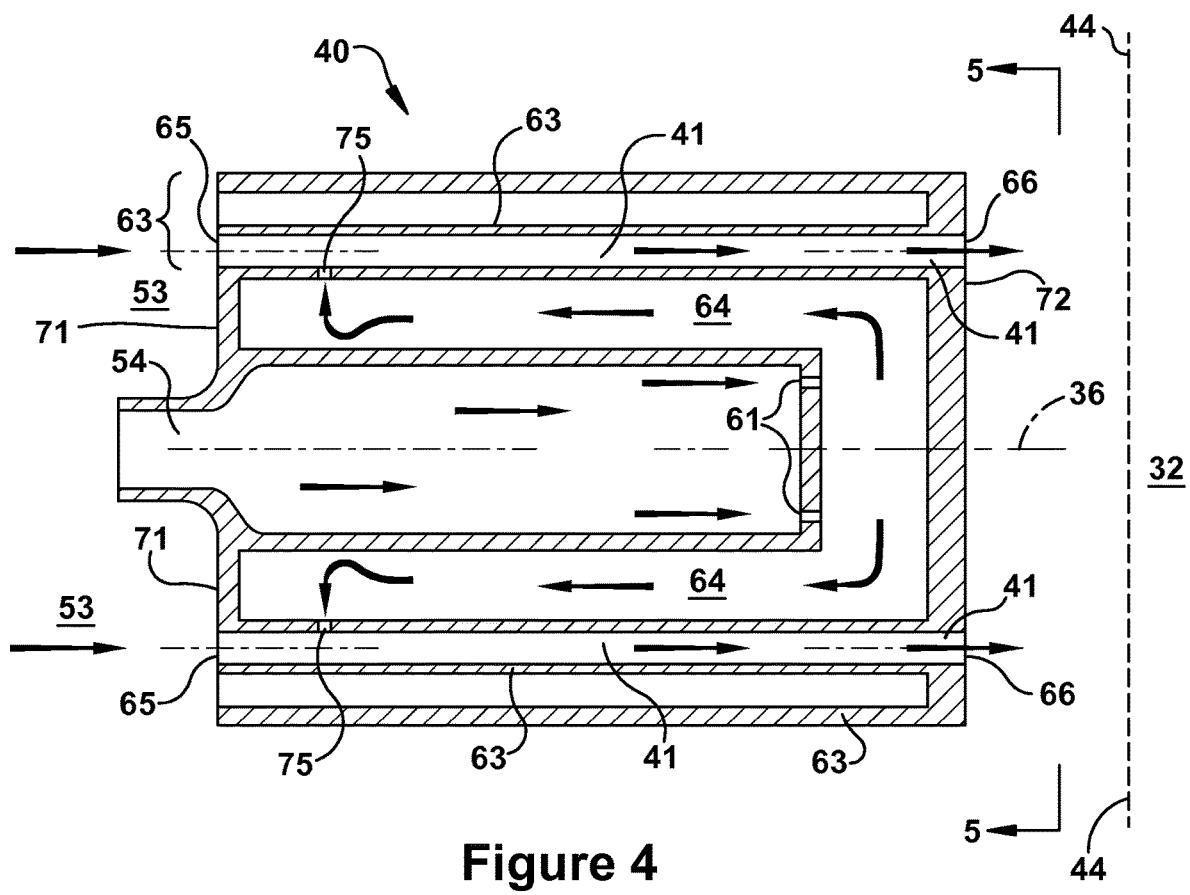
FIG. 4 illustrates a more detailed cross-sectional view of the combustor nozzle of FIG. 3.
Figure 5:
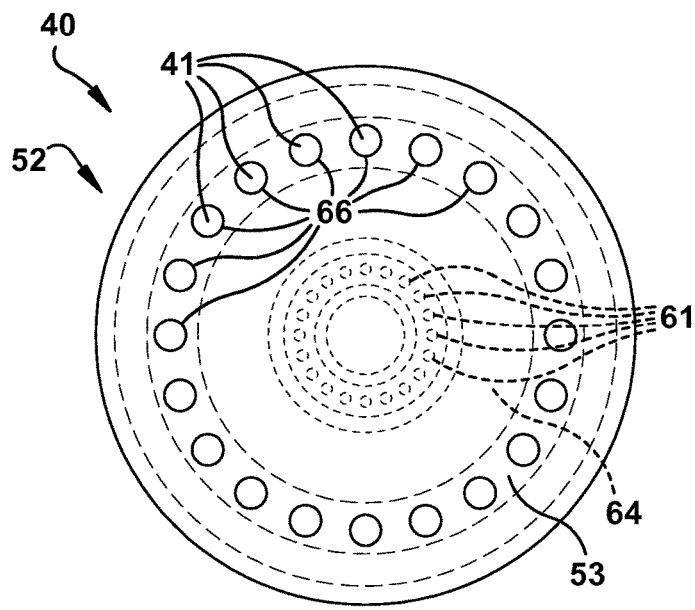
FIG. 5 illustrates an end view taken along the sight lines designated 5-5 in FIG. 4.

Turning now to FIGS. 3 through 5, an exemplary configuration of a premixing pilot nozzle 40 (or simply "pilot nozzle 40") is presented in accordance with certain aspects of the present invention. The pilot nozzle 40 may include several mixing tubes 41 within which a fuel and air mixture is created for combustion within the combustion chamber 32. FIGS. 3 through 5 illustrate one arrangement by which fuel and air may be supplied to the several mixing tubes 41 of the pilot nozzle 40. Another such fuel-air delivery configuration is provided in relation to FIG. 8, and it should be appreciated that other fuel and air supply arrangements are also possible and that these examples should not be construed as limiting unless indicated in the appended claim set.

As depicted in FIGS. 3, 4 and 5, the mixing tubes 41 may have a linear and axial configuration. In such cases, each mixing tube 41 may be configured so that a flow of fluid therefrom is discharged in a direction (or, as used herein, includes a "discharge direction") that is parallel to the central axis 36 of fuel nozzle 12 or, alternatively, at least lacks the tangentially canted orientation relative to the central axis 36 of the fuel nozzle. As used herein, such mixing tubes 41 may be referred to as "axial mixing tubes". Accordingly, an axial mixing tube 41 may be oriented so that it is substantially parallel to the central axis 36 of the fuel nozzle 12, or, alternatively, the axial mixing tube 41 may be oriented so to include a radially canted orientation relative to the central axis 36 as long as the mixing tube lacks the tangentially canted component. Other mixing tubes 41, which will be referred to as "canted mixing tubes", may include this tangentially angled or canted orientation such that each releases the mixture of fuel and air in a direction that is skewed or tangentially canted relative to the central axis 36 of the fuel nozzle 12. As described below, this type of configuration may be used to create a swirling pattern within the combustion zone upon release that improves certain performance aspects of the pilot nozzle 40 and, thereby, the performance of the fuel nozzle 12.

As illustrated, the fuel nozzle 12 may include an axially elongating peripheral wall 50 that defines an outer envelope of the component. The peripheral wall 50 of fuel nozzle 12 has an outer surface and an inner surface facing opposite the outer surface and defining an axially elongating inner cavity. As used herein, a central axis 36 of the nozzle 12 is defined as the central axis of the fuel nozzle 12 which, in this example, is defined as the central axis of the peripheral wall 50. The fuel nozzle 12 may further include a hollow, axially elongating centerbody 52 disposed within the cavity formed by the peripheral wall 50. Given the concentric arrangement that is shown between the peripheral wall 50 and the centerbody 52, the central axis 36 may be common to each component. The centerbody 52 may be axially defined by a wall that defines an upstream end and a downstream end. A primary air flow channel 51 may be defined in the annular space between the peripheral wall 50 and the exterior surface of the centerbody 52.

The fuel nozzle 12 may further include an axially elongated, hollow fuel supply line, which will be referred to herein as "center supply line 54", that extends through the center of the centerbody 52. Defined between the center supply line 54 and the outer wall of the centerbody 52, an elongated interior passage or secondary flow annulus 53 may extend axially from a forward position adjacent to the headend 27 toward the pilot nozzle 40. The center supply line 54 may similarly extend axially between the forward end of the centerbody 52, wherein it may form a connection with a fuel source (not shown) through the headend 27. The center supply line 54 may have a downstream end that is disposed at the aft end of the centerbody 52, and may provide a supply of fuel that ultimately is injected into the mixing tubes 41 of the pilot nozzle 40.

The primary fuel supply of the fuel nozzle 12 may be directed to the combustion chamber 32 of the combustor 16 through a plurality of swirler vanes 56 of, which, as illustrated in FIG. 3, may be fixed vanes that extend across the primary flow annulus 51. According to aspects of the present invention, the swirler vanes 56 may define a so-called "swozzle" type fuel nozzle in which multiple vanes 56 extends radially between the centerbody 52 and the peripheral wall 50. As schematically shown in FIG. 3, each of the swirler vanes 56 of the swozzle desirably may be provided with internal fuel conduits 57 that terminate in fuel injection ports 58 from which the primary fuel supply (the flow of which is indicated by the arrows) is introduced into the primary air flow being directed through the primary flow annulus 51. As this primary air flow is directed against the swirler vanes 56, a swirling pattern is imparted that, as will be appreciated, facilitates the mixing of the air and fuel supplies within the primary flow annulus 51. Downstream of the swirler vanes 56, the swirling air and fuel supplies brought together within the flow annulus 51 may continue to mix before being discharged into the combustion chamber 32 for combustion. As used herein, when distinguishing from the pilot nozzle 40, the primary flow annulus 51 may be referred to as a "parent nozzle", and the fuel-air mixture brought together within the primary flow annulus 51 may be referred to as originating within the "parent nozzle". When using these designations, it will be appreciated that the fuel nozzle 12 includes a parent nozzle and a pilot nozzle, and that each of these injects separate fuel and air mixtures into the combustion chamber.

The centerbody 52 may be described as including axially-stacked sections, with the pilot nozzle 40 being the axial section disposed at the downstream or aftward end of the centerbody 52. According to the exemplary embodiment shown, the pilot nozzle 40 includes a fuel plenum 64 disposed about a downstream end of the center supply line 54. As illustrated, the fuel plenum 64 may fluidly communicate with the center supply line 54 via one or more fuel ports 61. Thus, fuel may travel through the supply line 54 so as to enter the fuel plenum 64 via the fuel ports 61. The pilot nozzle 40 may further include an annular-shaped centerbody wall 63 disposed radially outward from the fuel plenum 64 and desirably concentric with respect to the central axis 36.

As stated, the pilot nozzle 40 may include a plurality of axially elongated, hollow mixing tubes 41 disposed just outboard of the fuel plenum 64. The pilot nozzle 40 may be axially defined by an upstream face 71 and a downstream face 72. As illustrated, the mixing tubes 41 may extend axially through the centerbody wall 63. A plurality of fuel ports 75 may be formed within the centerbody wall 63 for supplying fuel from the fuel plenum 64 into the mixing tubes 41. Each of the mixing tubes 41 may extend axially between an inlet 65, which is formed through the upstream face 71 of the pilot nozzle 40, and an outlet 66, which is formed through the downstream face 72 of the pilot nozzle 40. Configured thusly, an air flow may be directed into the inlet 65 of each mixing tube 41 from the secondary flow annulus 53 of the centerbody 52. Each mixing tube 41 may have at least one fuel port 75 that fluidly communicates with the fuel plenum 64 such that a flow of fuel exiting from the fuel plenum 64 passes into each mixing tube 41. A resulting fuel-air mixture may then travel downstream in each mixing tube 41, and then may be injected into the combustion chamber 32 from the outlets 66 formed through the downstream face 72 of the pilot nozzle 40. As will be appreciated, given the linear configuration and axial orientation of the mixing tubes 41 shown in FIGS. 3 through 5, the fuel-air mixture that discharges from the outlets 66 is directed in a direction that is substantially parallel to the central axis 36 of the fuel nozzle 12. While the fuel-air mixture tends to spread radially from each mixing tube 41 upon being injected into the combustion chamber 32, applicants have discovered that the radial spread is not significant. Indeed, studies have shown that the equivalence ratio (i.e., air/fuel ratio) at the section of the burn exit plane 44 that is located immediately downstream of the outlet 66 of each mixing tube 41 can be almost twice the equivalence ratio that exists at the section of the burn exit plane 44 that is located immediately downstream of the central axis 36. High equivalence ratios at a location that is immediately downstream of the outlet 66 of each mixing tube 41 can continuously and effectively light the fuel-air mixture through parent nozzle, and thereby may be used to stabilize the flame even if the flame operates near lean-blow-out ("LBO") condition.

Figure 6:
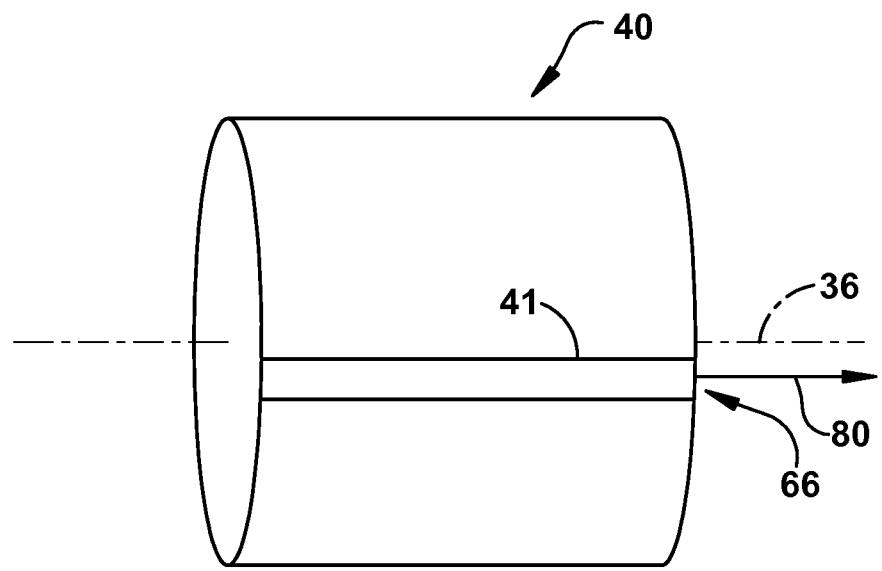
FIG. 6 includes a simplified side view of a mixing tube that may be used in a pilot nozzle.
Figure 7:
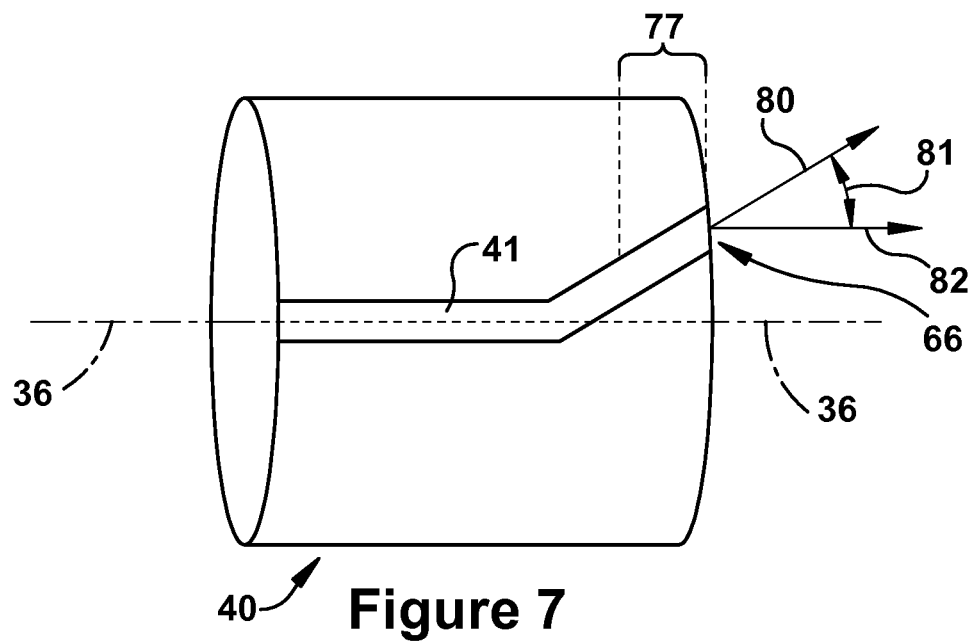
FIG. 7 illustrates a simplified side view of an alternative mixing tube having a canted configuration according to certain aspects of the present invention.

FIGS. 6 and 7 include a simplified side view comparing different orientations of a single mixing tube 41 within a pilot nozzle 40 relative to the central axis 36 of the fuel nozzle 12 (i.e., as may be defined by the peripheral wall 50). FIG. 6 shows a mixing tube 41 having an axial configuration, which is the configuration discussed above in relation to FIGS. 3 through 5. As indicated, the mixing tube 41 is aligned substantially parallel to the central axis 36 so that the fuel-air mixture discharged therefrom (i.e., from the outlet 66) has a direction of discharge ("discharge direction") 80 that is approximately parallel to a downstream continuation of the central axis 36 of the fuel nozzle 12.

As illustrated in FIG. 7, according to an alternative embodiment of the present invention, the mixing tube 41 includes a canted outlet section 79 at a downstream end that is angled or canted tangentially relative to the central axis 36 of the fuel nozzle 12. Configured in this manner, the fuel-air mixture that flows from the outlet 66 has a discharge direction 80 that extends from and follows the tangentially canted orientation of the canted outlet section 79. As used herein, the canted outlet section 79 may be defined in relation to the acute tangential angle 81 it forms relative to the downstream direction of the axial reference line 82 (which, as used herein, is defined as a reference line that is parallel to the central axis 36).

As discussed in more detail below, performance advantages for the pilot nozzle 40 may be achieved by configuring the several mixing tubes to include such canted orientations.

Typically the mixing tubes 41 may each be similarly configured and arranged in parallel, though certain embodiments discussed in more detail below include exceptions to this. The extent to which the canted outlet sections 79 of the mixing tubes 41 are tangentially angled, i.e., the size of the tangential angle 81 formed between the discharge direction 80 and the axial reference line 82, may vary. As will be appreciated, the tangential angle 81 may depend upon several criteria. Further, though results may be optimal at certain values, various levels of desirable performance benefits may be achieved across a wide spectrum of values for the tangential angle 81. Applicants have been able to determine several preferred embodiments which will now be disclosed. According to one embodiment, the tangential angle 81 of the canted mixing tube 41 includes a range of between 10° and 70°. According to another embodiment, the tangential angle 81 includes a range of between 20° and 55°. Finally, according to a last embodiment, the mixing tubes 41 preferably are configured such that the tangential angle 81 is between approximately 40° to 50°.

Though the simplified version shown in FIG. 7 shows only one mixing tube 41, each of the mixing tubes 41 may have a similar configuration and, relative to each other, may be oriented in parallel. When the angled orientation is applied consistently to each of the multiple mixing tubes 41 included in the pilot nozzle 40, it will be appreciated that the tangential orientation of the discharge direction creates a swirling flow just downstream of the downstream face 72 of the pilot nozzle 40. As discovered by the present applicants, this swirling flow may be used to achieve certain performance advantages, which will be described in more detail below. According to one exemplary embodiment, the mixture discharged from the mixing tubes 41 may be made to "co-swirl" with the swirling fuel-air mixture that is exiting from the primary flow annulus 51 (i.e., in cases where the primary flow annulus 51 includes the swirler vanes 56).

As described in relation to several alternative embodiments provided below, the mixing tubes 41 may be configured to achieve this tangentially angled discharge direction 80 in several ways. For example, mixing tubes 41 that include linear segments that connect at elbows (as in FIG. 7) may be used to angle the discharge direction. In other cases, as provided below, the mixing tubes 41 may be curved and/or helically formed so to achieve the desired direction of discharge. Additionally, combinations of linear segments and curved or helical segments may be used, as well as any other geometry that allows the exiting flow of the mixing tubes 41 to discharge at a tangential angle relative to the central axis 36 of the primary flow annulus 51.

Figure 8:
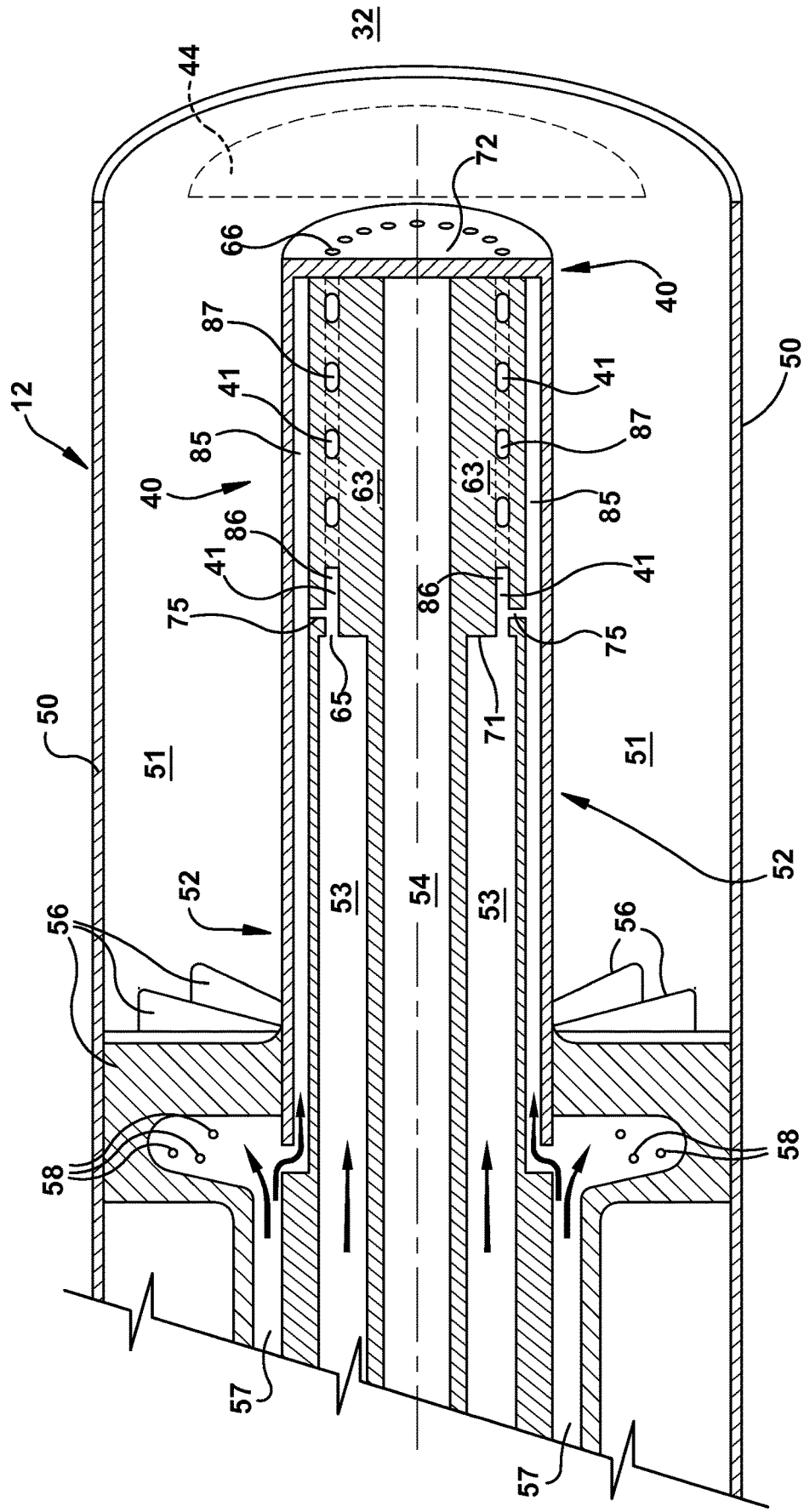
FIG. 8 shows a cross-sectional view depicting an exemplary pilot nozzle having canted mixing tubes according to certain aspects of the present invention.
Figure 9:
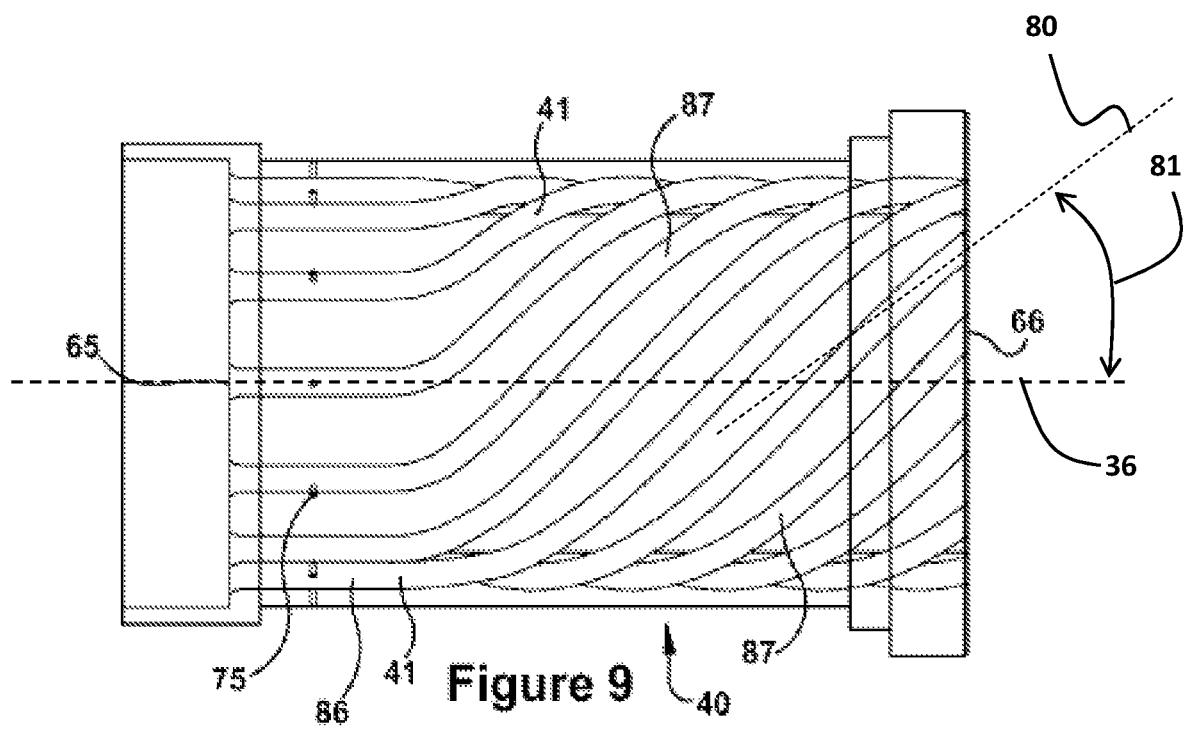
FIG. 9 illustrates a side view of canted mixing tubes according to an exemplary embodiment of the present invention.
Figure 10:
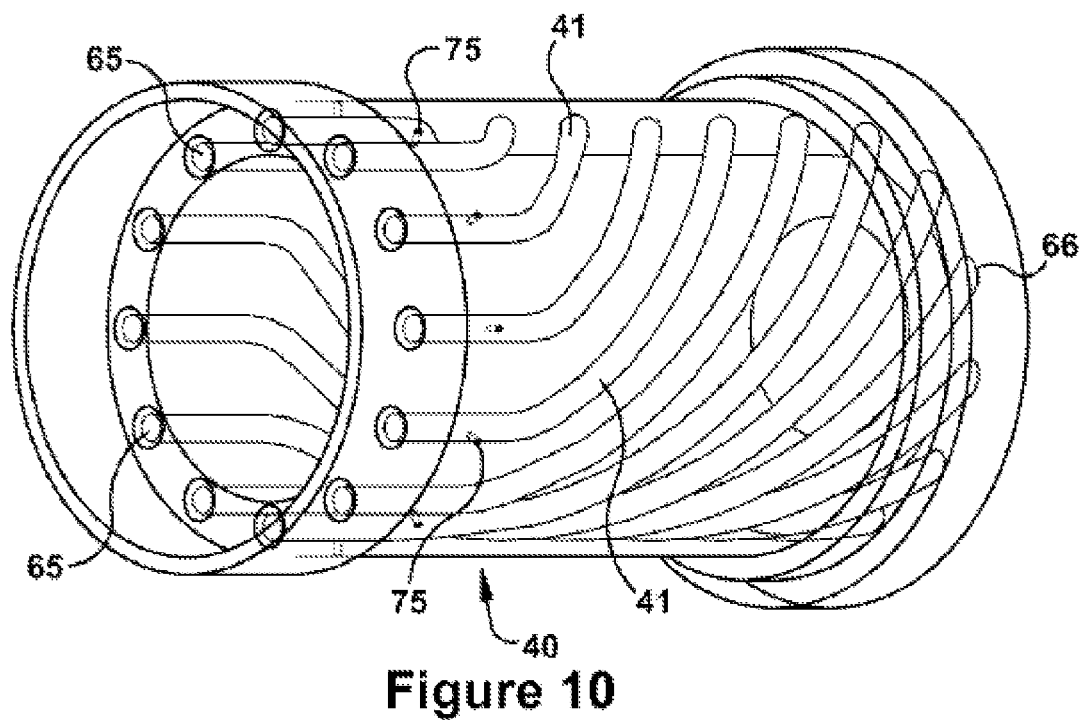
FIG. 10 includes a perspective view of the mixing tube of FIG. 9.

FIGS. 8 through 12 illustrate exemplary embodiments that include a mixing tube 41 having angled or canted configurations according to the present invention. FIG. 8 shows an exemplary helical configuration for the mixing tubes 41, and is also provided to illustrate an alternative preferred arrangement by which fuel and air may be delivered to the mixing tubes 41 of a pilot nozzle 40. In this case, an outboard fuel channel 85 is disposed within the centerbody wall 63 and extends axially from an upstream connection made with a fuel conduit 57 that, as illustrated in FIGS. 3 and 4, also supplies fuel to the ports 58 of the swirler vanes 56. As such, given the configuration of FIG. 8, instead of the fuel being delivered from a fuel plenum located radially inward relative to the mixing tubes 41, the fuel is delivered from the fuel channel 85 that is disposed just outboard of the mixing tubes 41.

As will be appreciated, the outboard fuel channel 85 may be formed as an annular passage or as several discrete tubes formed about the circumference of the centerbody 52 so to desirably coincide with the locations of the mixing tubes 41. One or more fuel ports 75 may be formed so to fluidly connect the outboard fuel channel 85 to each of the mixing tubes 41. In this manner, an upstream end of each of the mixing tubes 41 may be connected to a fuel source. As further illustrated, the secondary flow annulus 53 may be formed within the centerbody 52 and extend axially therethrough so to deliver a supply of air to each of the inlets 65 of the mixing tubes 41. Unlike the embodiment of FIGS. 3 and 4, it will be appreciated that the centrally disposed center supply line 54 of the centerbody 52 is not used to deliver fuel to the mixing tubes 41. Even so, the center supply line 54 may be included so to provide or enable other fuel types for the fuel nozzle 12. In any case, the interior passage or secondary flow annulus 53 may be formed as an elongated passage that is defined between a central structure, such as the outer surface of the center supply line 54, and an inner surface of the centerbody wall 63. Other configurations are also possible.

Similar to the configuration taught in FIG. 7, each of the mixing tubes 41 may include a canted outlet section 79 that is tangentially angled relative to the central axis 36 of the fuel nozzle 12. In this manner, the discharge direction 80 for the fuel-air mixture moving through the mixing tubes 41 may be similarly canted relative to the central axis 36 of the fuel nozzle 12. According to the preferred embodiments of FIGS. 8 through 10, each of the mixing tubes 41 includes an upstream linear section 86 that transitions to a downstream helical section 87, which as indicated, curves around the central axis 36. In one embodiment, the fuel ports 74 are located in the upstream linear section 86, and the downstream helical section 87 promotes mixing of the fuel and air, causing the constituents to change direction within the mixing tube 41. This change of direction has been found to create secondary flows and turbulence that promote mixing between the fuel-air moving therethrough, such that a well-mixed fuel-air mixture emerges from the mixing tubes 71 at the desired angled discharge direction.

According to preferred embodiments, multiple mixing tubes 41 are provided about the circumference of the pilot nozzle 40. For example, between ten and fifteen tubes may be defined within the centerbody wall 63. The mixing tubes 41 may be spaced at regular circumferential intervals. The direction of discharge 80 defined by the canted outlet section 79 may be configured so that it is consistent with or in the same direction as the direction of swirl created within the primary flow annulus 51 by the swirler vanes 56. More specifically, according to a preferred embodiment, the canted outlet section 79 may be angled in the same direction as the swirler vanes 56 so to produce flow that swirls in the same direction about the central axis 36.

Figure 11:
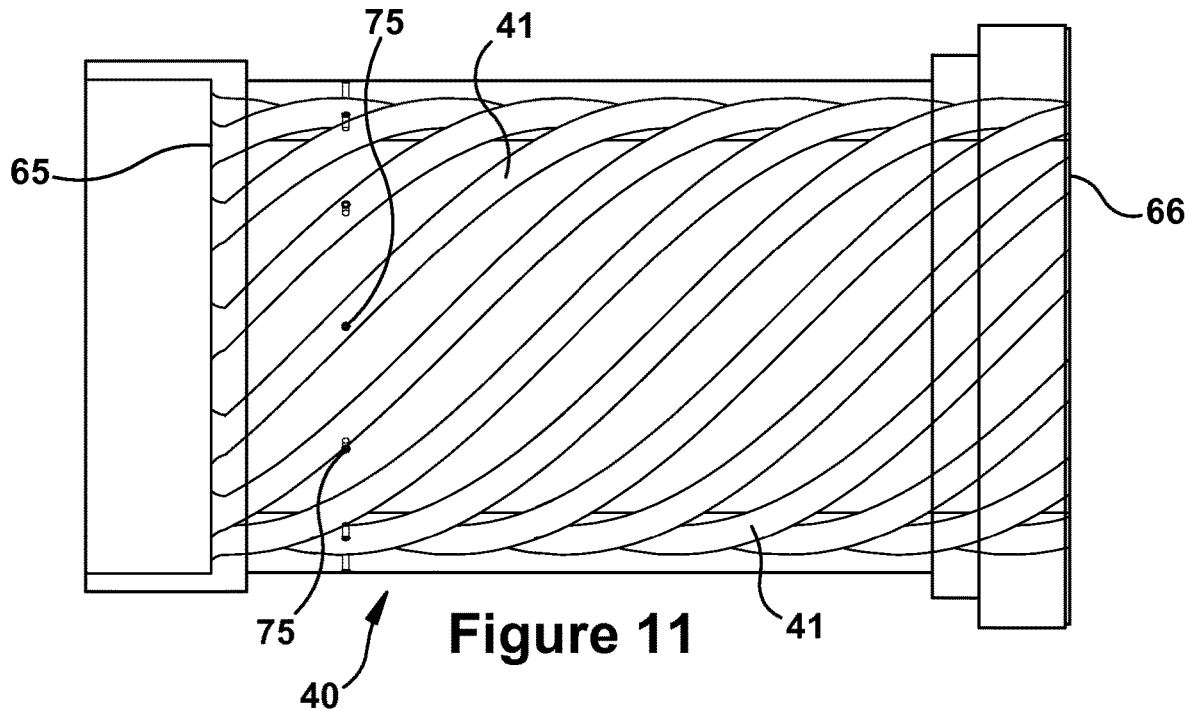
FIG. 11 illustrates a side view of canted mixing tubes according to an alternative embodiment of the present invention.

Another exemplary embodiment is provided in FIG. 11, which includes mixing tubes 41 having a curved helical formation for the entire mixing length of the mixing tubes 41. As used herein, the mixing length of a mixing tube 41 is the axial length between the location of the initial (i.e., furthest upstream) fuel port 75 and the outlet 66. As will be appreciated, each of the mixing tubes 41 may include at least one fuel port 75. According to alternative embodiments, each mixing tube 41 may include a plurality of fuel ports 75. The fuel ports 75 may be axially spaced along the mixing length of the mixing tube 41. According to a preferred embodiment, however, the fuel ports 75 are positioned or concentrated toward the upstream end of the mixing tube 41, which results in the fuel and air being brought together early so more mixing may occur before the combined flow is injected from the outlets 66 into the combustion chamber 32.

Figure 12:
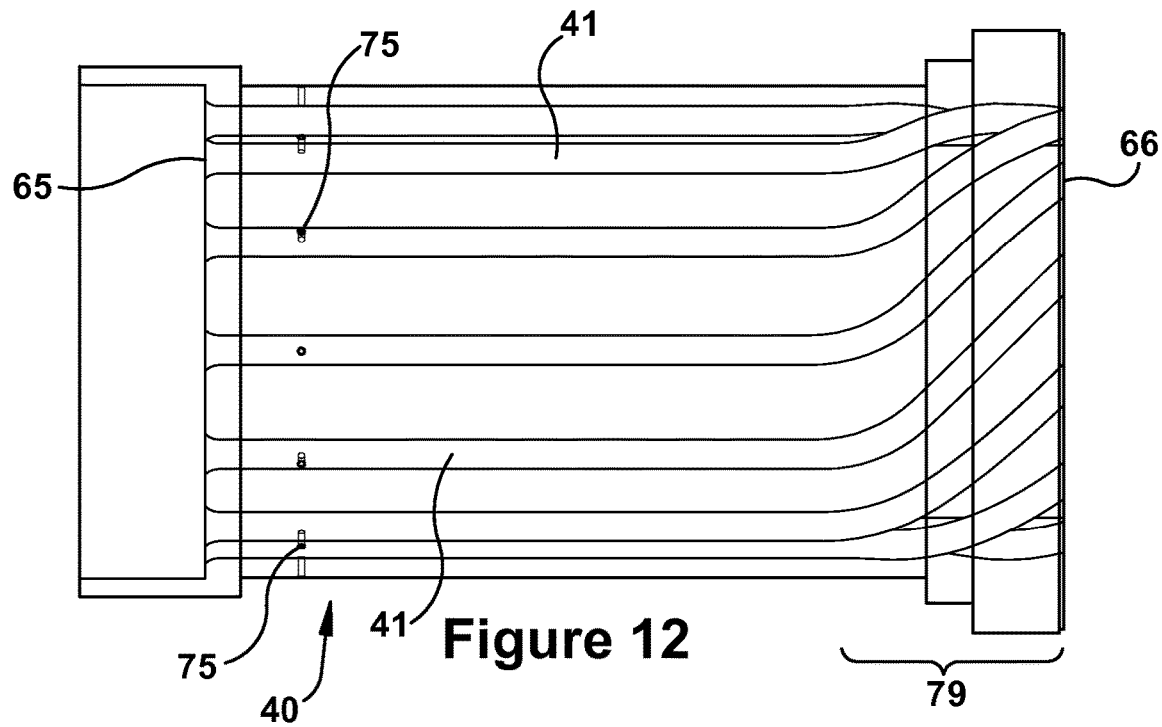
FIG. 12 shows a side view of canted mixing tube according to another alternative embodiment of the present invention.

According to another embodiment, as illustrated in FIG. 12, the canted portion of the mixing tube 41 may be confined to just a downstream section of the mixing tube 41, which as shown represents an axially narrow length that is adjacent to the outlet 66. With this configuration, beneficial results may still be achieved because the desirable swirling pattern may still be induced within the collective discharge from the mixing tubes 41. However, the level of fuel-air mixing within the mixing tube 41 may be less than optimal.

Figure 13:
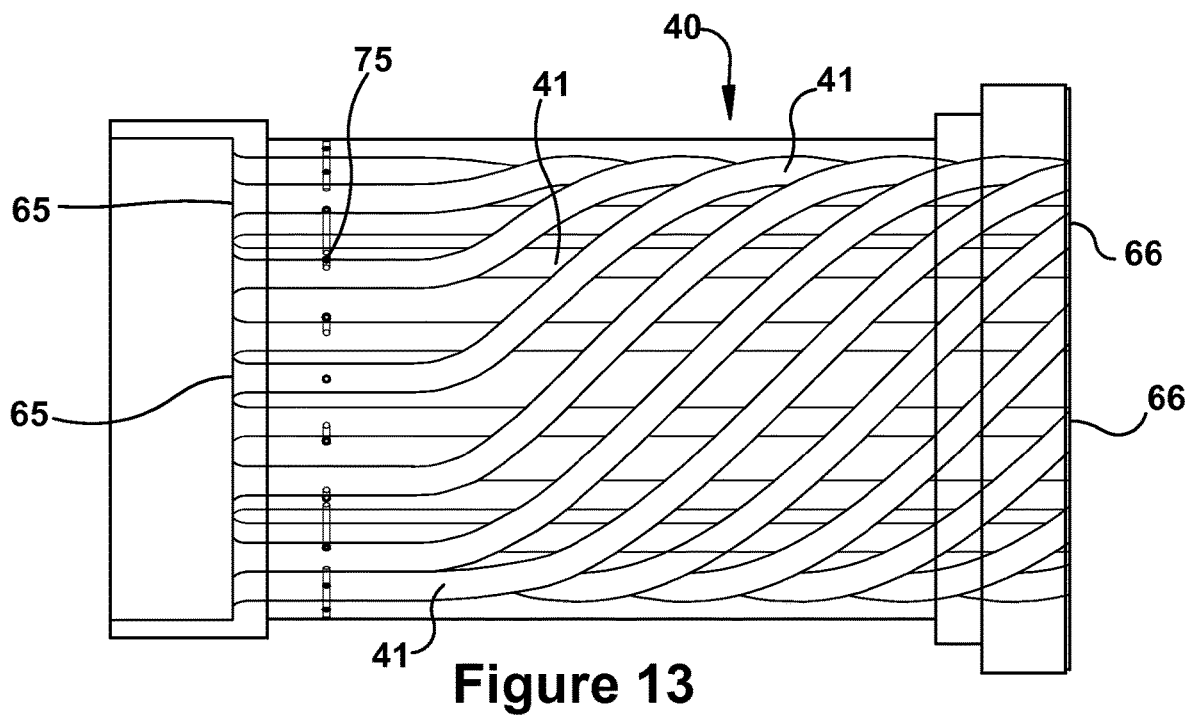
FIG. 13 illustrates a side view of an additional embodiment in which linear mixing tubes are combined with canted mixing tubes.
Figure 14:
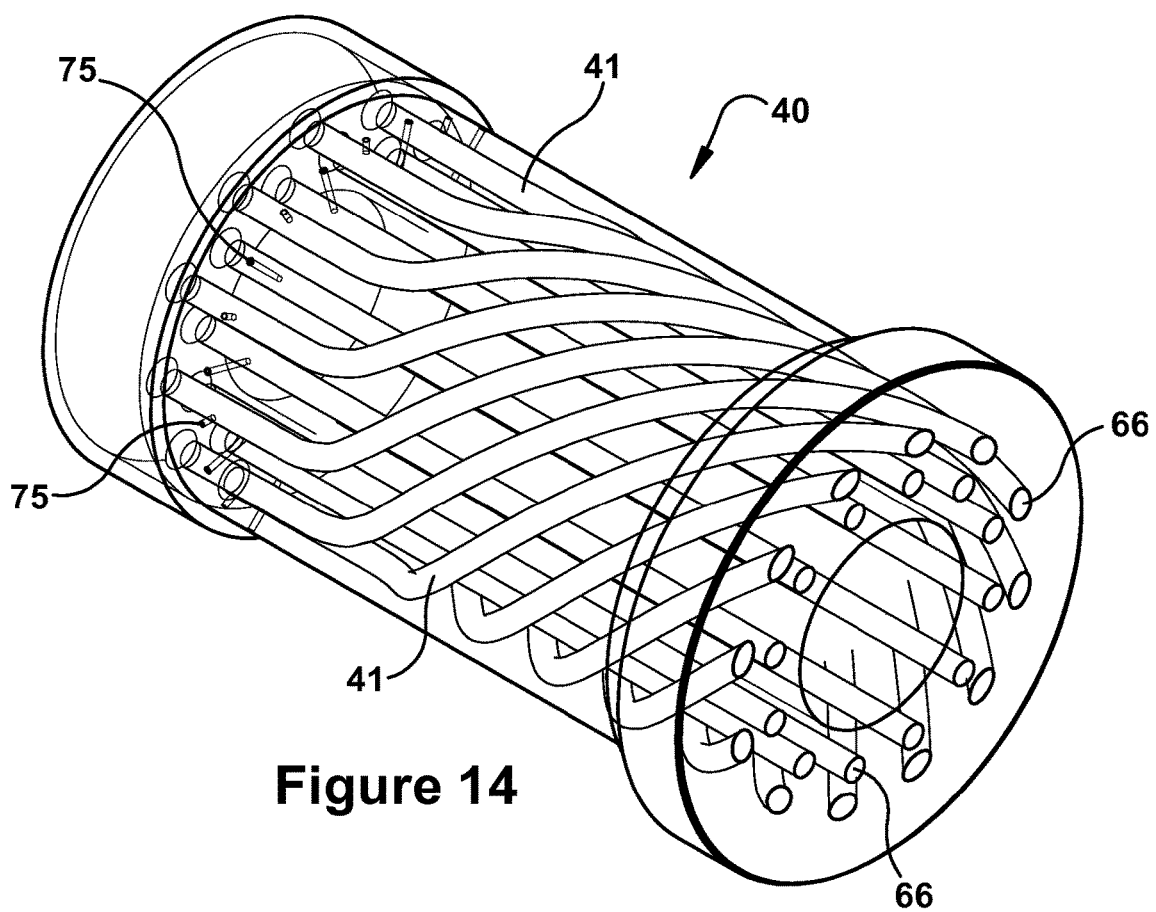
FIG. 14 includes a perspective view of the mixing tubes of FIG. 13.
Figure 15:
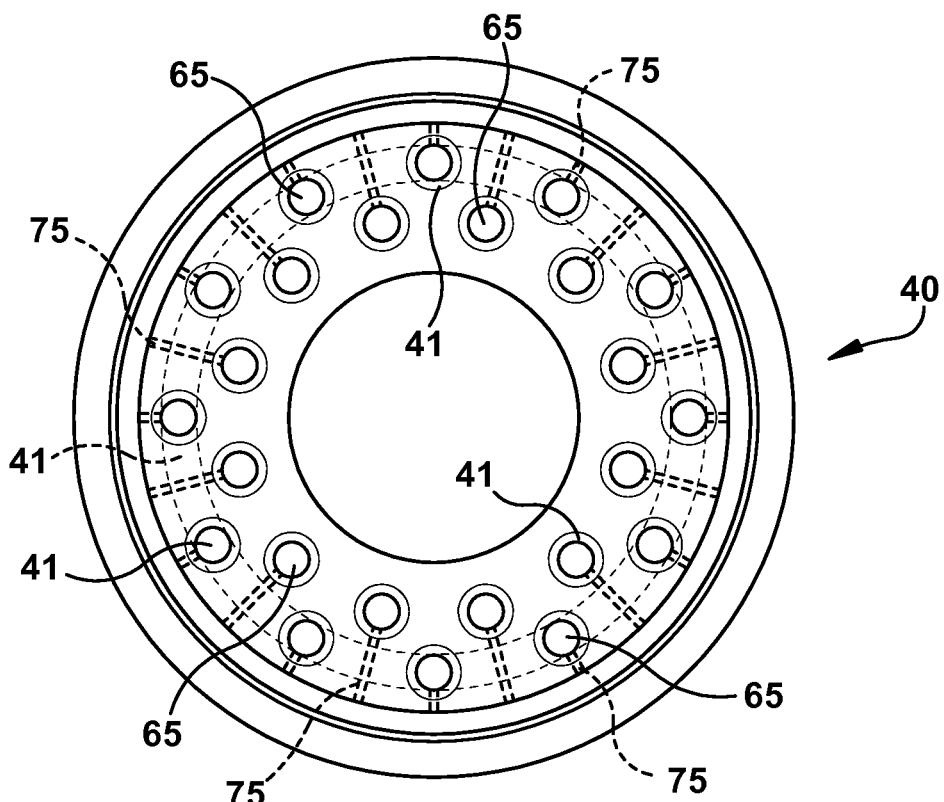
FIG. 15 shows an inlet view of the mixing tubes of FIG. 13.
Figure 16:
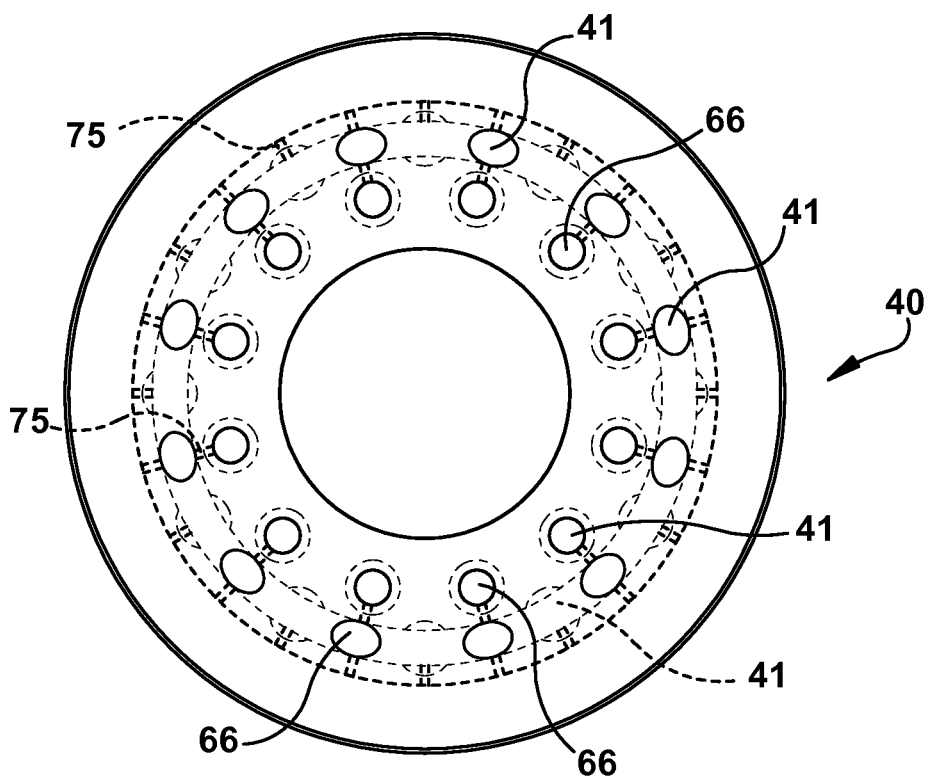
FIG. 16 illustrates an exit view of the mixing tubes of FIG. 13.

FIGS. 13 through 16 illustrate additional embodiments in which linear and helical mixing tubes 41 are combined. FIGS. 13 and 14 illustrate, respectively, a side view and a perspective view of a preferred way in which linear axial mixing tubes 41 (i.e., those that extend parallel to the central axis 36) may be arranged with canted mixing tubes 41 within the centerbody wall 63 of the nozzle 40. As shown, the canted mixing tubes 41 may be helically formed. As will be appreciated, the canted mixing tubes 41 also may be formed with a linearly segmented configuration that includes a bend or elbow junction between segments, such as the example of FIG. 12. FIG. 15, as will be appreciated, provides an inlet view that shows the inlets 65 of the axial and canted mixing tubes 41 on the upstream face 71 of the pilot nozzle 40. FIG. 16 provides an outlet view illustrating a representative arrangement of the outlets 66 of the axial and canted mixing tubes 41 on the downstream face 72 of the pilot nozzle 40. According to alternative embodiments, the canted mixing tubes 41 may be configured to co-swirl, i.e. swirl about the central axis 36 in the same direction, with the swirling mix of the parent nozzle of the primary flow annulus 51.

The axial and canted mixing tubes may both be supplied from the same air and fuel sources. Alternatively, each of the different types of mixing tubes may be supplied from different supply feeds such that the level of fuel and air reaching the mixing tubes is either appreciably different or controllable. More specifically, as will be appreciated, supplying each tube type with its own controllable air and fuel supplies enables flexibility in machine operation, which may allow adjustment or tuning of the fuel-air or equivalence ratio within the combustion chamber. Different settings may be used throughout range of loads or operating levels, which, as discovered by the applicants of the presentation, offers a way to address particular areas of concern that may occur at different engine load levels.

For example, in a turndown operating mode when combustion temperatures are low relative to baseload, CO is the primary emission concern. In such cases, equivalence ratios may be increased to increase tip zone temperatures for improved CO burnout. That is, because the canted mixing tubes act to draw parent nozzle reactants back to the nozzle tip, the temperature at the tip zone (i.e., the tip of the nozzle) may remain cooler than if the tubes were not tangentially angled. In some instances, this may contribute to excess CO in the emissions of the combustor. However, by adding or increasing the axial momentum through the addition of the axial mixing tubes (as illustrated in FIGS. 13 through 16), the amount of recirculation flow can be altered, limited, or controlled, and, therefore, enable a means for controlling the tip zone temperature. This methodology, thus, may serve as an additional way to improve combustion characteristics and emission levels when the engine is operated in certain modes.

According to other embodiments, for example, the present invention includes using conventional control systems and methods for manipulating air flow levels between the two different types of mixing tubes. According to one embodiment, the airflow to the axial mixing tubes 41 may be increased to prevent cooler reactant products from the parent nozzle from being drawn back into the tip zone of the pilot nozzle 40. This may be used to increase the temperature of the tip zone, which may decrease the levels of CO.

Additionally, combustion dynamics may have a strong correlation to shearing in the reacting zones. By adjusting the amount of air directed through each of the different types of mixing tubes (i.e., the canted and axial), the amount of shear can be tuned to a level that positively affects combustion. This may be accomplished through configuring metering orifices so to deliver uneven air amounts to the different types of mixing tubes. Alternatively, active control devices may be installed and actuated via conventional methods and systems so to vary air supply levels during operation. Further, control logic and/or a control feedback loop may be created so that the control of the devices responds to an operating mode or measured operating parameter. As mentioned, this may result in varying control settings according to the mode of operation of the engine, such as when operating at full load or reduced load levels, or in reaction to measured operator parameter readings. Such systems may also include the same type of control methods in regard to varying the amount of fuel being supplied to the different types of mixing tubes. This may be accomplished through prearranged component configurations, i.e., orifice sizing and the like, or through more active, real-time control. As will be appreciated, operating parameters such as temperatures within the combustion chamber, acoustic variations, reactant flow patterns, and/or other parameters related to combustor operation may be used as part of a feedback loop in such control system.

Figure 19:
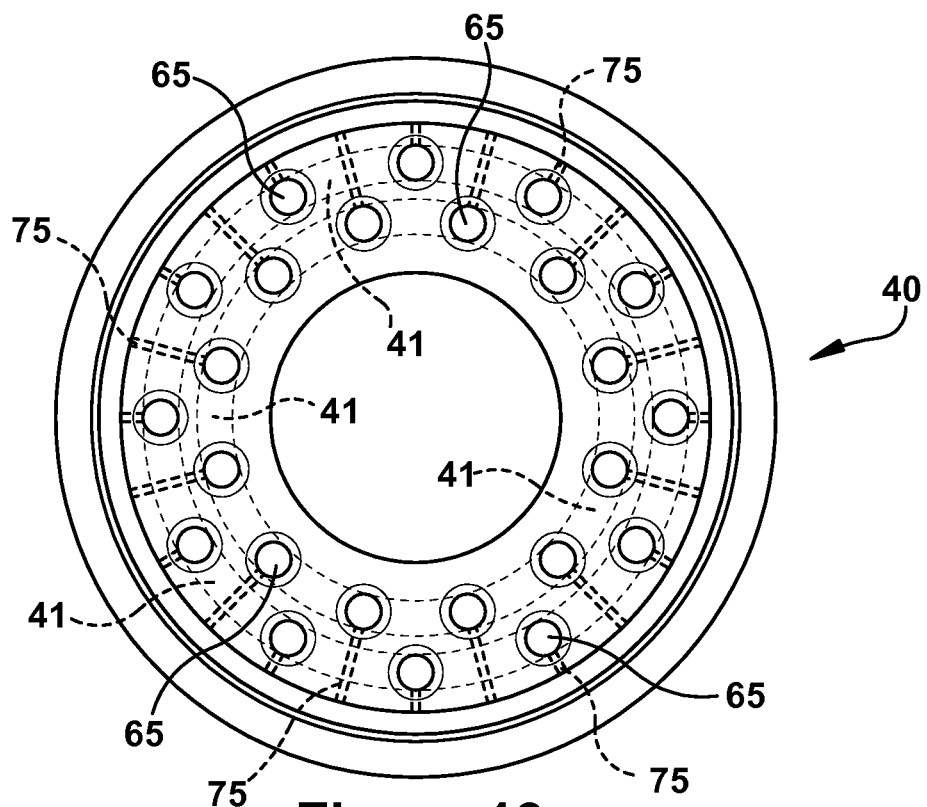
FIG. 19 shows an inlet view of the mixing tubes of FIG. 17.
Figure 20:
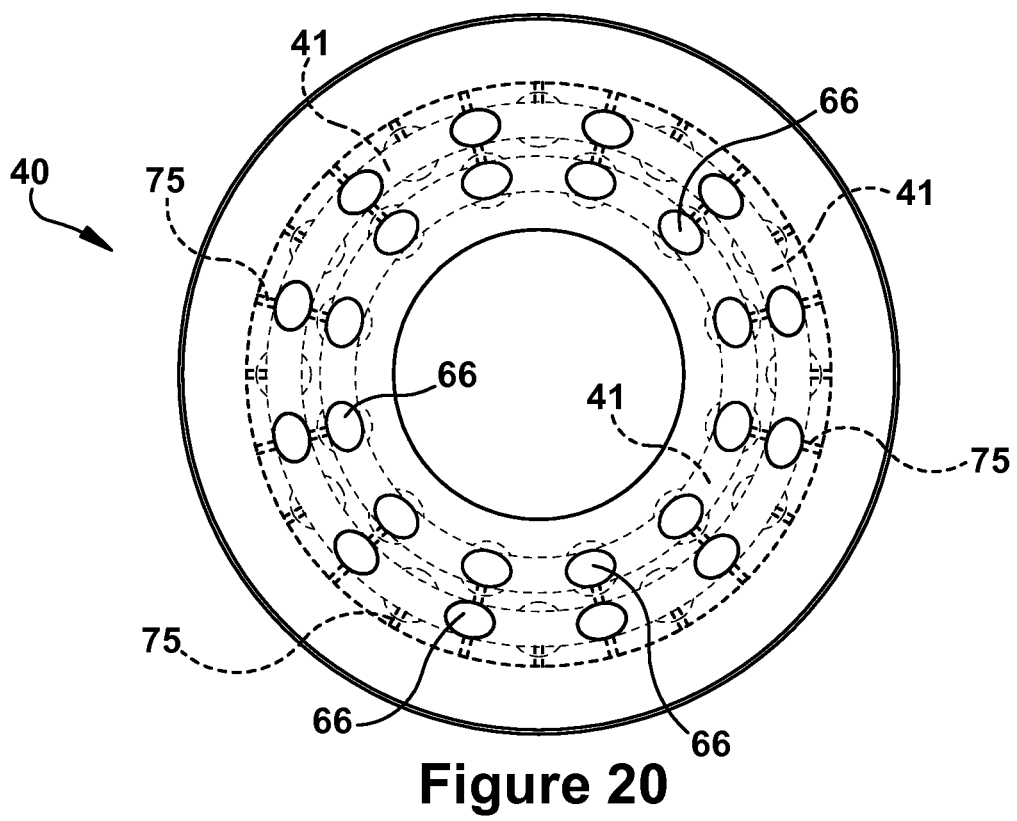
FIG. 20 illustrates an exit view of the mixing tubes of FIG. 17.
Figure 21:
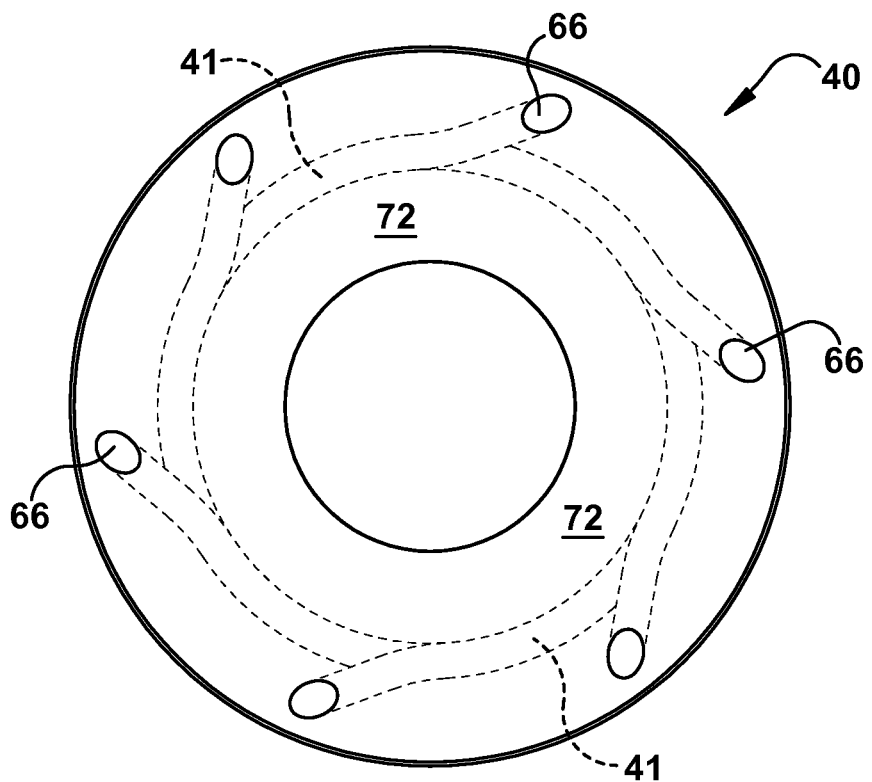
FIG. 21 illustrates an exit view of an alternative embodiment of mixing tubes that includes an outboard component to the direction of discharge.
Figure 22:
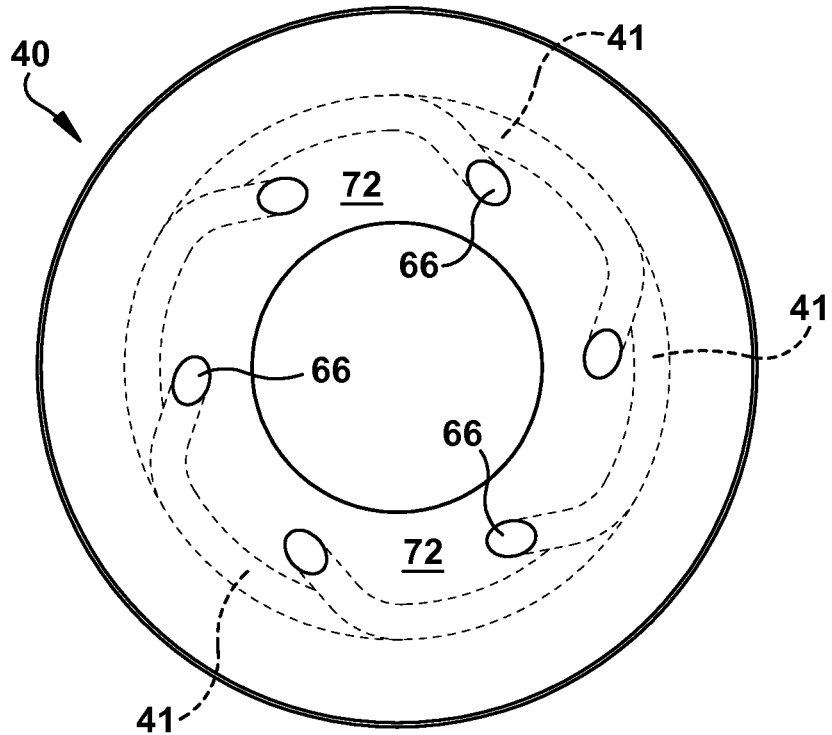
FIG. 22 illustrates an exit view of an alternative embodiment of mixing tubes that includes an inboard component to the direction of discharge.

As will be appreciated, these types of control methods and systems also may be applicable to the other embodiments discussed herein, including any of those involving combining mixing tubes in the same pilot nozzle that have dissimilar configurations or swirl directions (including, for example, the counter-swirl embodiments discussed in relation to FIGS. 17 through 20, or the embodiments of FIGS. 21 and 22 that illustrate ways in which a subset of flow tubes may be configured to have discharge directions that include radial components). Further, these types of control methods and systems may be applicable to the other embodiments discussed herein, including any of those involving combining mixing tubes in the same pilot nozzle that have dissimilar configurations or swirl directions (such as the counter-swirl embodiments discussed in relation to FIGS. 17 through 20).

Additionally, such methods and systems may be applied to pilot nozzle configurations in which each of the mixing tubes are configured in the same way and aligned parallel to each other. In these instances, the control systems may operate to control combustion processes by varying air and/or fuel splits between the parent nozzle and the pilot nozzle to affect combustion characteristics. According to other embodiments, the control methods and systems may be configured so to vary fuel and/or air supply levels unevenly about the circumference of the pilot nozzle, which, for example, may be used to interrupt certain flow patterns or to prevent harmful acoustics from developing. Such measures may be taken on a preemptive basis or in response to a detected anomaly. The fuel and air supply, for example, may be increased or decreased to a particular subset of the mixing tubes. This action may be taken on a predefined periodic basis, in response to a measured operating parameter, or other condition.

Figure 17:
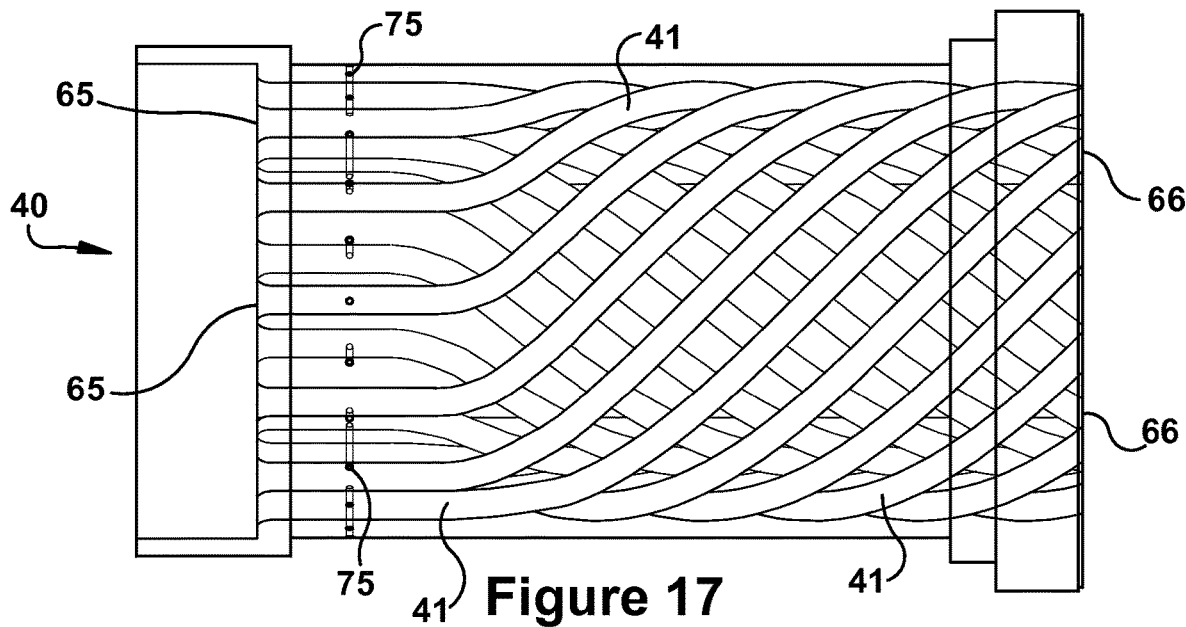
FIG. 17 illustrates a side view of an additional embodiment that includes counter-swirling helical mixing tubes according to certain other aspects of the present invention.
Figure 18:
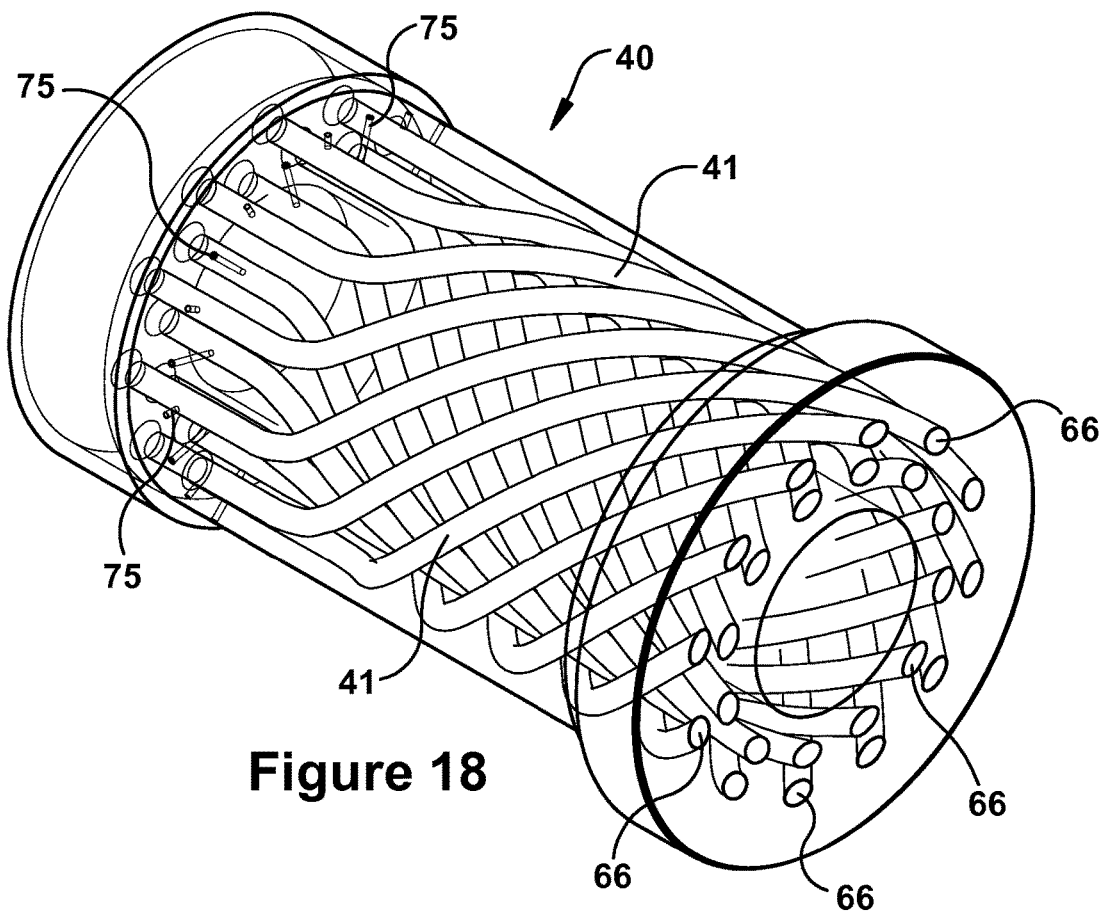
FIG. 18 includes a perspective view of the mixing tubes of FIG. 17.

FIGS. 17 through 20 illustrate additional exemplary embodiments in which canted mixing tubes 41 having counter-swirling configurations defined within the centerbody wall 63. FIGS. 17 and 18 illustrate, respectively, a side view and a perspective view of a representative arrangement of the counter-swirling helical mixing tubes 41 within the centerbody wall 63. FIG. 19, as will be appreciated, provides an inlet view of the pilot nozzle 40, illustrating a representative arrangement of the inlets 65 of the counter-swirling helical mixing tubes 41 on the upstream face 71 of the pilot nozzle 40. FIG. 20 provides an outlet view of the pilot nozzle 40, illustrating a preferred way in which the outlets 66 of the counter-swirling helical mixing tubes 41 may be arranged on the downstream face 72 of the pilot nozzle 40. As will be appreciated, the addition of counter-swirling canted mixing tubes 41 may be used in the ways discussed above to control the temperature at the tip zone of the nozzle. Additionally, the counter-swirling canted mixing tubes promote greater mixing in the tip zone area due to increased shear caused by the counter-swirling pilot flows, which may be advantageous for certain operating conditions.

FIGS. 21 and 22 illustrate alternative embodiments in which a radial component is added to the discharge direction of the mixing tubes 41. As will be appreciated, FIG. 21 illustrates an exit view of an alternative embodiment of mixing tubes that includes an outboard component to the direction of discharge. In contrast, FIG. 22 illustrates an exit view of an alternative embodiment of mixing tubes that includes an inboard component to the direction of discharge. In these ways, the canted mixing tubes of the present invention may be configured to have both a radial component and a tangential component in discharge direction. According to an alternative embodiment, mixing tubes may be configured to have a discharge direction having radial, but no circumferential, component. Thus, inboard and the outboard radial components may be added to either of the axial and the canted mixing tubes. According to exemplary embodiments, the angle of the inboard and/or the outboard radial component may include a range of between 0.1° and 20°. As mentioned above, the radial component may be included on a subset of the mixing tubes and thereby may be used to manipulate the shearing effect of the pilot nozzle so to favorably control recirculation.

Figure 23:
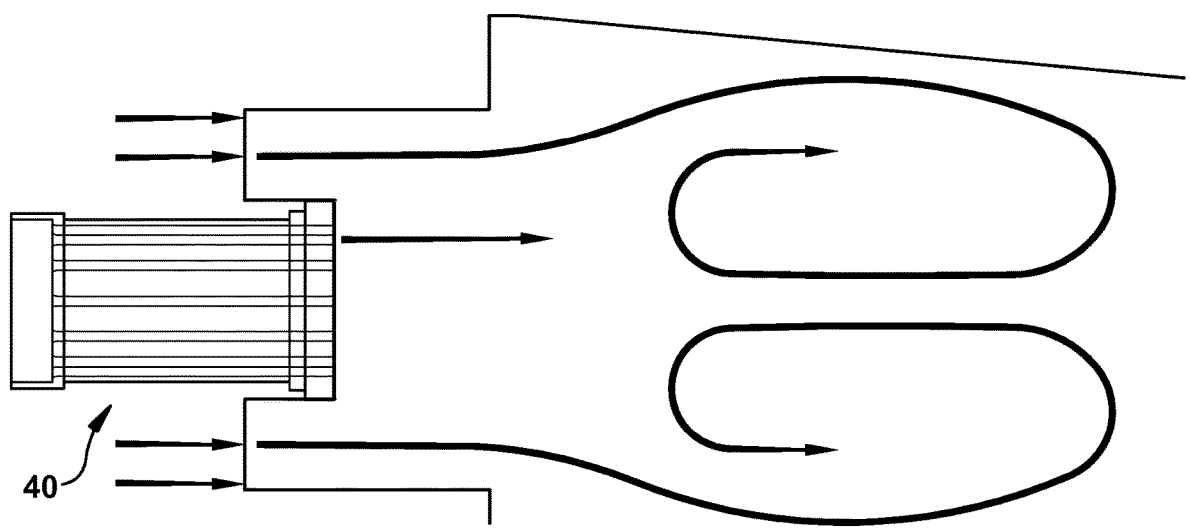
FIG. 23 schematically illustrates results of a directional flow analysis of mixing tubes having a linear or axial orientation.
Figure 24:
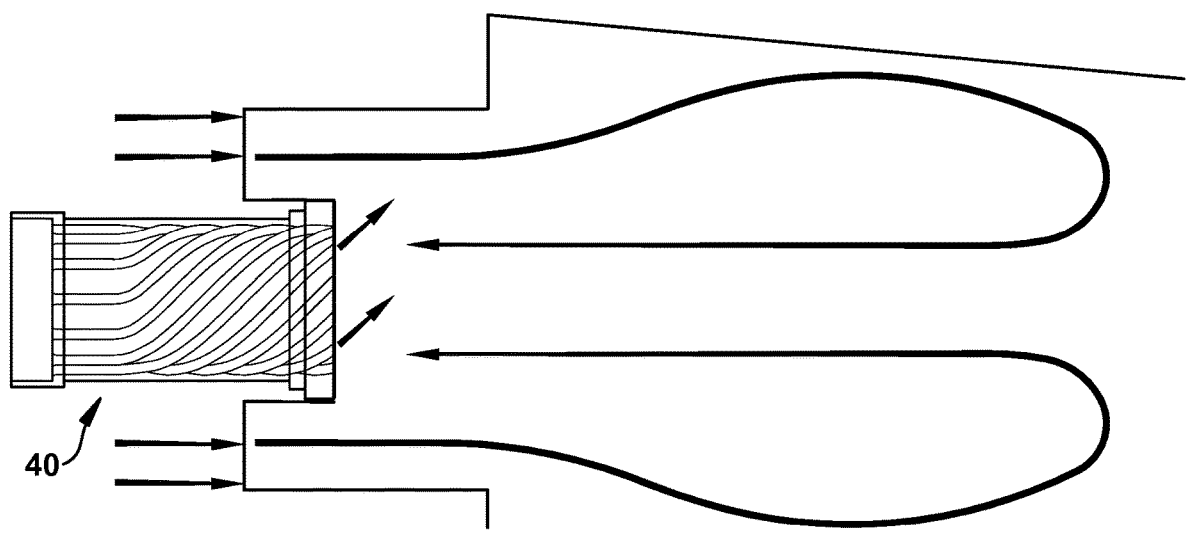
FIG. 24 schematically illustrates results of a directional flow analysis of mixing tubes having a tangentially canted orientation.

FIG. 23 schematically illustrates results of a directional flow analysis of a pilot nozzle 40 having axial mixing tubes 41 that include an axial outlet section, while FIG. 24 schematically illustrates a results of a directional flow analysis of canted mixing tubes 41 having a canted outlet section. Axially mixing tubes 41, as illustrated, may oppose the reversed flow created by the swirl induced by the parent nozzles, which may compromise flame stability and increases the likelihood of lean blow out. The canted outlet section, in contrast, may be configured to swirl the pilot reactants around the fuel nozzle axis in the same direction as the swirl created in the primary or parent nozzle. As the results indicate, this swirling flow proves beneficial because the pilot nozzle now works in tandem with the parent nozzle to create and/or enhance a central recirculation zone. As illustrated, the recirculation zone associated with the canted mixing tubes includes a much more pronounced and centralized recirculation that results in the bringing reactants from a position far downstream back to the outlet of the fuel nozzle. As will be appreciated, the central recirculation zone is the foundation for swirl stabilized combustion because the products of combustion are drawn back to the nozzle exit and introduced to fresh reactants so to ensure the ignition of those reactants and, thereby, continue the process. Thus, the canted mixing tubes may be used to improve the recirculation and thereby further stabilize the combustion, which may be used to further stabilize lean fuel-air mixtures that may enable lower NOx emission levels. Additionally, as discussed, pilot nozzles having canted mixing tubes may enable performance benefits related to CO emissions levels. This is achieved due to the richening circulation that creates local hot zone at the exit of the fuel nozzle, which attaches nozzle flames and enables further CO burnout. Additionally, the pronounced recirculation produced by canted mixing tubes of the present invention may aid in CO burnout by mixing the products and CO generated during combustion back into the central recirculation zone so to minimize the chance for CO to escape unburnt.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to fall within the scope of the claims if they include structural elements that do not differ from the literal language of the claims, or if they include equivalent structural elements with insubstantial differences from the literal language of the claims.

What is claimed is:

1. A fuel nozzle for a combustor of a gas turbine engine, the fuel nozzle comprising:
 an axially extending centerbody disposed along a central axis of the fuel nozzle;
 an axially elongated peripheral wall circumscribing the axially extending centerbody, thereby defining a first flow annulus between the axially extending centerbody and the axially elongated peripheral wall;
 wherein the axially extending centerbody comprises:
  a first annular wall defining a second flow annulus in fluid communication with a supply of air;
  a second annular wall concentrically circumscribing the first annular wall and defining a third flow annulus between the first annular wall and the second annular wall, the third flow annulus in fluid communication with a supply of fuel;
  a downstream face connected to a perimeter of the second annular wall and defining a terminal surface of the axially extending centerbody;
  an upstream face extending radially across the first annular wall and disposed upstream from the downstream face;
  a plurality of mixing tubes extending through a solid portion of the axially extending centerbody with the solid portion extending from the upstream face to the downstream face, each mixing tube of the plurality of mixing tubes having an inlet defined through the upstream face in fluid communication with the second flow annulus, an outlet defined through the downstream face, and at least one radial fuel port in fluid communication with the third flow annulus, the at least one radial fuel port being disposed through a sidewall of each mixing tube of the plurality of mixing tubes proximate to the inlet;
  wherein the inlets of the plurality of mixing tubes are circumferentially spaced about the central axis at a common radial distance from the central axis;
  wherein the outlets of the plurality of mixing tubes are circumferentially spaced about the central axis at the common radial distance from the central axis;

wherein each mixing tube of the plurality of mixing tubes defines a helical shape such that the outlet is circumferentially offset from the inlet;

wherein a fuel-air mixture discharged from the outlets of the plurality of mixing tubes exhibits a first swirling flow;

wherein each mixing tube of the plurality of mixing tubes comprises a linear segment extending axially downstream from the inlet, the linear segment being upstream of the helical shape; and wherein the at least one radial fuel port is disposed through the sidewall of the linear segment.

2. The fuel nozzle of claim 1, wherein the third flow annulus has a uniform cross-sectional shape.

3. The fuel nozzle of claim 1, wherein each mixing tube of the plurality of mixing tubes defines a fuel-air mixing length from the at least one radial fuel port to the outlet; and wherein the linear segment of each mixing tube of the plurality of mixing tubes is less than one half of the fuel-air mixing length of each respective mixing tube.

4. The fuel nozzle of claim 1, wherein the helical shape of each mixing tube of the plurality of mixing tubes is confined to an axially narrow downstream section of each mixing tube of the plurality of mixing tubes, the axially narrow downstream section being immediately upstream of the outlet.

5. The fuel nozzle of claim 1, wherein the outlet of each mixing tube of the plurality of mixing tubes defines a tangential discharge angle relative to a centerline extending from the inlet of each mixing tube of the plurality of mixing tubes.

6. The fuel nozzle of claim 1, wherein the at least one radial fuel port of each mixing tube of the plurality of mixing tubes comprises a plurality of radial fuel ports; wherein the plurality of radial fuel ports comprises an upstream concentration relative to a flow of the air through the inlet of each mixing tube of the plurality of mixing tubes.

7. The fuel nozzle of claim 1, wherein between five and twenty-five mixing tubes comprise the plurality of mixing tubes; and wherein the plurality of mixing tubes are circumferentially spaced at regular intervals.

8. The fuel nozzle of claim 1, wherein a plurality of swirler vanes extend radially across the first flow annulus between the second annular wall and the axially elongated peripheral wall; and wherein each swirler vane of the plurality of swirler vanes defines a fuel passage therethrough, the fuel passages being in fluid communication with the third flow annulus.

9. The fuel nozzle of claim 8, wherein the plurality of swirler vanes produce a second swirling flow in a first direction; and wherein the plurality of mixing tubes produce the first swirling flow in the first direction.

10. The fuel nozzle of claim 1, wherein at least two or more mixing tubes in the plurality of mixing tubes are parallel to one another.

11. The fuel nozzle of claim 1, wherein the inlets of the plurality of mixing tubes have a common diameter, and the outlets of the plurality of mixing tubes have the common diameter.

12. The fuel nozzle of claim 1, wherein an entire length of each mixing tube of the plurality of mixing tubes remains at the common radial distance from the central axis from the inlet to the outlet of each mixing tube of the plurality of mixing tubes.

13. A fuel nozzle for a combustor of a gas turbine engine, the fuel nozzle comprising:

an axially extending centerbody disposed along a central axis of the fuel nozzle;

an axially elongated peripheral wall circumscribing the axially extending centerbody, thereby defining a first flow annulus between the axially extending centerbody and the axially elongated peripheral wall;

wherein the axially extending centerbody comprises:

a second flow annulus in fluid communication with a supply of air;

a third flow annulus in fluid communication with a supply of fuel;

a downstream face defining a terminal surface of the axially extending centerbody;

an upstream face disposed upstream from the downstream face;

a plurality of mixing tubes extending through a solid portion of the axially extending centerbody with the solid portion extending from the upstream face to the downstream face, each mixing tube of the plurality of mixing tubes having an inlet defined through the upstream face in fluid communication with the second flow annulus, an outlet defined through the downstream face, and at least one radial fuel port in fluid communication with the third flow annulus, the at least one radial fuel port being disposed through a sidewall of each mixing tube of the plurality of mixing tubes proximate to the inlet;

wherein the inlets of the plurality of mixing tubes are circumferentially spaced about the central axis at a common radial distance from the central axis;

wherein the outlets of the plurality of mixing tubes are circumferentially spaced about the central axis at the common radial distance from the central axis;

wherein each mixing tube of the plurality of mixing tubes comprises a curved path between the inlet and the outlet, and the curved path extends circumferentially about the central axis such that the outlet is circumferentially offset from the inlet;

wherein a fuel-air mixture discharged from the outlets of the plurality of mixing tubes exhibits a swirling flow;

wherein each mixing tube of the plurality of mixing tubes comprises a linear segment extending axially downstream from the inlet, the linear segment being upstream of the curved path; and wherein the at least one radial fuel port is disposed through the sidewall of the linear segment.

14. The fuel nozzle of claim 13, wherein an entire length of each mixing tube of the plurality of mixing tubes remains at the common radial distance from the central axis from the inlet to the outlet of each mixing tube of the plurality of mixing tubes.

15. The fuel nozzle of claim 13, wherein the curved path comprises a helical shape.

16. A fuel nozzle for a combustor of a gas turbine engine, the fuel nozzle comprising:

an axially extending centerbody disposed along a central axis of the fuel nozzle;

an axially elongated peripheral wall circumscribing the axially extending centerbody, thereby defining a first flow annulus between the axially extending centerbody and the axially elongated peripheral wall;

wherein the axially extending centerbody comprises:

a second flow annulus in fluid communication with a supply of air;

a third flow annulus in fluid communication with a supply of fuel;

a plurality of mixing tubes each extending through a solid portion of the axially extending centerbody with the solid portion extending from an upstream face to a downstream face, each mixing tube of the plurality of mixing tubes having an inlet defined through the upstream face in fluid communication with the second flow annulus, an outlet defined through the downstream face in fluid communication with the first flow annulus, and at least one radial fuel port in fluid communication with the third flow annulus, the at least one radial fuel port being disposed through a sidewall of each mixing tube of the plurality of mixing tubes proximate to the inlet;

wherein the inlets of the plurality of mixing tubes are circumferentially spaced about the central axis at a common radial distance from the central axis;

wherein the outlets of the plurality of mixing tubes are circumferentially spaced about the central axis at the common radial distance from the central axis;

wherein each mixing tube of the plurality of mixing tubes comprises a curved path between the inlet and the outlet, and the curved path extends circumferentially about the central axis such that the outlet is circumferentially offset from the inlet;

wherein a fuel-air mixture discharged from the outlets of the plurality of mixing tubes exhibits a swirling flow;

wherein each mixing tube of the plurality of mixing tubes comprises a linear segment extending axially downstream from the inlet, the linear segment being upstream of the curved path; and wherein the at least one radial fuel port is disposed through the sidewall of the linear segment.

17. The fuel nozzle of claim 16, wherein an entire length of each mixing tube of the plurality of mixing tubes remains at the common radial distance from the central axis from the inlet to the outlet of each mixing tube of the plurality of mixing tubes.

18. The fuel nozzle of claim 16, wherein the curved path comprises a helical shape.

\* \* \* \* \*